(12) United States Patent
Katsura

(10) Patent No.: US 7,942,165 B2
(45) Date of Patent: May 17, 2011

(54) CONNECTION STRUCTURE BETWEEN INTEGRATED PANEL AND FLUID DEVICE

(75) Inventor: Masayoshi Katsura, Hyogo (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 793 days.

(21) Appl. No.: 11/988,555

(22) PCT Filed: Jun. 15, 2006

(86) PCT No.: PCT/JP2006/312013
§ 371 (c)(1),
(2), (4) Date: Jan. 10, 2008

(87) PCT Pub. No.: WO2007/007508
PCT Pub. Date: Jan. 18, 2007

(65) Prior Publication Data
US 2009/0126808 A1     May 21, 2009

(30) Foreign Application Priority Data

Jul. 12, 2005 (JP) ................................ 2005-202934
Jul. 13, 2005 (JP) ................................ 2005-203940

(51) Int. Cl.
*F16J 15/10*      (2006.01)
(52) U.S. Cl. .................... 137/884; 285/328; 285/336
(58) Field of Classification Search .............. 137/884; 285/328, 336, 341, 379
See application file for complete search history.

(56) References Cited

U.S. PATENT DOCUMENTS

| 2,050,137 | A | * | 8/1936 | Walsh ........................... 285/331 |
| 4,988,130 | A | * | 1/1991 | Obara et al. ................... 285/328 |
| 5,160,178 | A | * | 11/1992 | Iwabuchi ....................... 285/328 |
| 5,355,908 | A | * | 10/1994 | Berger et al. ............ 137/614.04 |
| 6,070,912 | A | * | 6/2000 | Latham ........................... 285/61 |
| 6,135,155 | A | * | 10/2000 | Ohmi et al. .................... 137/884 |
| 6,892,749 | B2 | * | 5/2005 | Fukano et al. ................. 137/269 |
| 7,017,609 | B2 | * | 3/2006 | Miwa ............................. 137/884 |

FOREIGN PATENT DOCUMENTS

| JP | 61-187946 | 11/1986 |
| JP | 2002 523 708 T | 7/2002 |

* cited by examiner

*Primary Examiner* — John Fox
(74) *Attorney, Agent, or Firm* — Bacon & Thomas, PLLC

(57) ABSTRACT

A connecting structure for an integration panel and a fluid device in which an excellent sealing property can be held even when substantially no further fastening is performed, and the assembling workability is improved is provided. When an integration panel 1 and a valve 2 are to be communicatingly connected to each other in a sealed state through single circular pipe-like fluid passages 3, 7 by using an annular gasket G, an annular projection 11 and outer and inner tapered peripheral faces 12a, 13a are formed in first and second fluid supply/discharge port portions 1A, 2A, and the gasket G is configured by a fluororesin having a pair of annular grooves 51, 51 and tapered peripheral faces 52a, 53a. The integration panel 1 and the valve 2 are attracted to each other, thereby configuring a joined state where a sealing portion S1 is formed by fitting the annular projection 11 to the annular groove 51 to press contact the tapered peripheral faces 12a, 13a, 52a, 53a with each other.

16 Claims, 23 Drawing Sheets

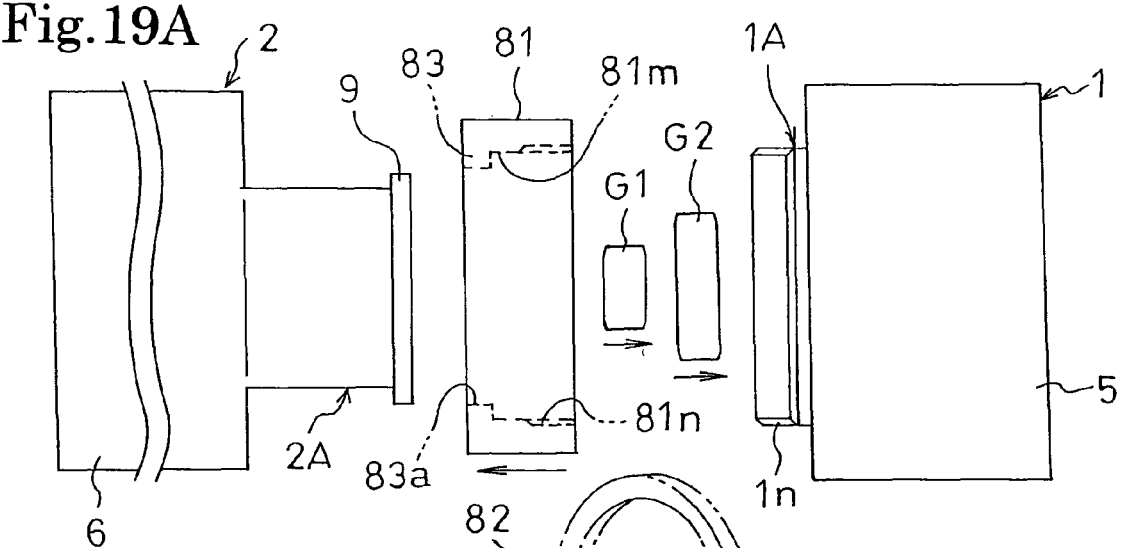
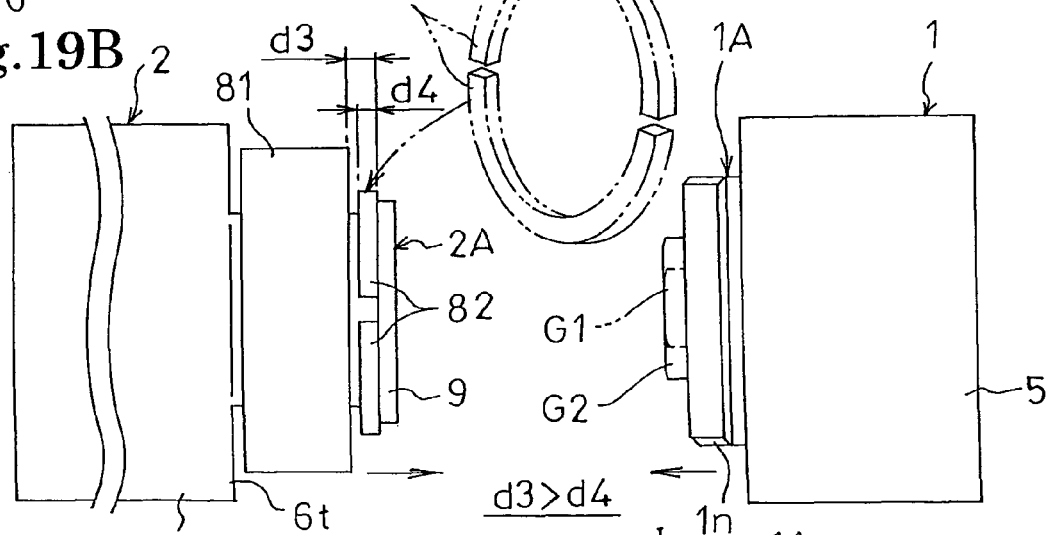
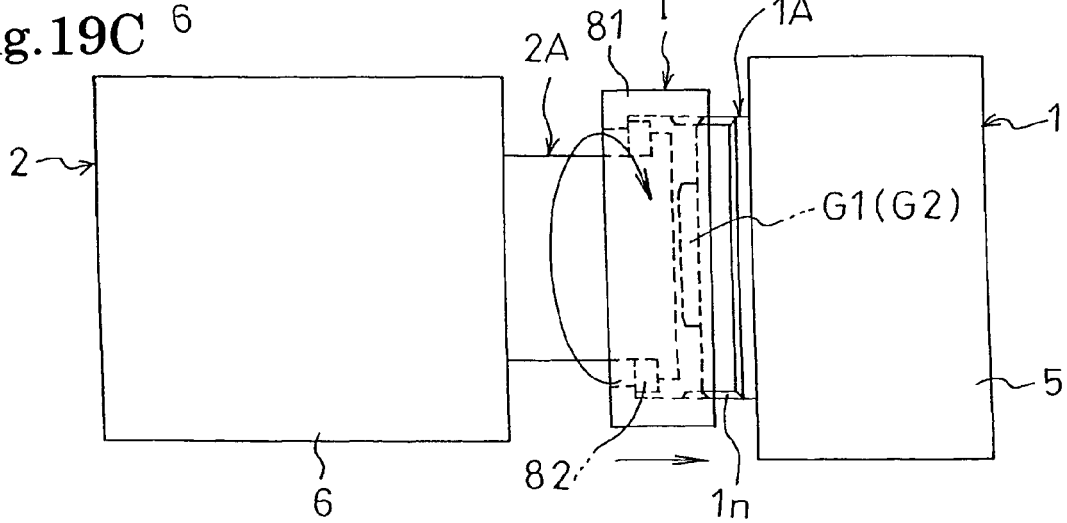

US 7,942,165 B2

CONNECTION STRUCTURE BETWEEN INTEGRATED PANEL AND FLUID DEVICE

TECHNICAL FIELD

The present invention relates a connecting structure for an integration panel and a fluid device, and more particularly to a connecting structure for communicatingly connecting an integration panel for a fluid which is expected to be largely used, with a fluid device such as a pump, a valve, or an accumulator via a gasket in a sealed state in a piping system or the like for high-purity liquid, ultrapure water, cleaning liquid, or the like that is handled in a production process in various technical fields such as semiconductor production, medical and pharmaceutical production, food processing, and chemical industry.

BACKGROUND ART

An example of such a connecting structure is a structure where a valve which is an example of a fluid device is connected and coupled to an integration panel in which a fluid passage is internally formed, by causing a pair of supply/discharge flow paths to communicate with each other. Connecting structures are disclosed in Patent Reference 1 and Patent Reference 2. The connecting structure disclosed in Patent Reference 1 is a structure where a pair of supply and discharge flow paths are juxtaposed each other, and liquid-tightly connected and coupled to each other by plural bolts via annular gaskets which are independent of each other. The connecting structure disclosed in Patent Reference 2 is a structure where a pair of supply and discharge flow paths are juxtaposed each other, and a single gasket having a pair of flow path holes corresponding to the pair of supply and discharge flow paths is connected and coupled by using a single external screw nut.

Both of the connecting structures disclosed in Patent References 1 and 2 employ a structure in which many fluid apparatuses are integrately attached to a fluid block, or a so-called integrated piping structure. This is useful for compactifying or modularizing the whole of a piping system.
Patent Reference 1: Japanese Patent Application Laying-Open No. 2001-82609
Patent Reference 2: Japanese Patent Application Laying-Open No. 10-169859

DISCLOSURE OF THE INVENTION

Problems to be Solved by the Invention

In the connecting structures disclosed in Patent References 1 and 2, a pair of flange portions between which a gasket is interposed are caused to exhibit an effective sealing performance by fastening bolts until a predetermined surface pressure is attained. However, it is inevitable that the fastening force of the bolts is reduced with time. In order to prevent leakage from a connecting portion due to reduction of the fastening force, i.e., torque down, therefore, further fastening must be periodically performed. In the case where sealing is performed by using a gasket, a very high fastening force is necessary. Therefore, fluid supply/discharge port portions of an integration panel or a fluid device require high strength. The case is disadvantageous also in the workability of connection and coupling.

The invention has been conducted in view of the circumstances. It is an object of the invention to improve a connecting structure for an integration panel and a fluid device in a fluid piping system, thereby providing a connecting structure for an integration panel and a fluid device in which an excellent sealing property can be held even when substantially no further fastening is performed, and the assembling workability is improved.

In order to further promote compactification and modularization, miniaturization of a fluid device itself is naturally requested. However, it is expected that, after compactification of a fluid device itself is realized, a request for compactifying a connecting structure for an integration panel and a fluid device is produced.

Therefore, it is a second object of the invention to, in order to promote integration of a piping system using an integration panel having the above-described advantages, propose and realize a connecting structure for an integration panel and a fluid device which can be further compactified.

Means for Solving the Problems

The invention of claim 1 is a connecting structure for an integration panel and a fluid device, wherein, when a first fluid supply/discharge port portion 1A of an integration panel 1 having the first fluid supply/discharge port portion 1A where pipe-like fluid passages 3, 4 are opened, and a second fluid supply/discharge port portion 2A of a fluid device 2 having the second fluid supply/discharge port portion 2A where pipe-like fluid passages 7, 8 are opened are to be communicatingly connected to each other in a state where the fluid passages 3, 4, 7, 8 are sealed by a ring-like gasket G interposed between the first fluid supply/discharge port portion 1A and the second fluid supply/discharge port portion 2A, in the first fluid supply/discharge port portion 1A and the second fluid supply/discharge port portion 2A, annular projections 11, 21 are formed on outer-diameter portions of the fluid passages 3, 4, 7, 8 which are opened in end faces, the gasket G is configured by a flexible material having: a fluid path W which is formed to allow the corresponding fluid passages 3, 4, 7, 8 of the first and second fluid supply/discharge port portions 1A, 2A to communicate with each other; a pair of annular grooves 51, 51 which are formed on an outer-diameter portion of the fluid path W to be fitted respectively to the annular projections 11, 21 formed on the end faces of the first and second fluid supply/discharge port portions 1A, 2A; and inner and outer peripheral wall end portions 52, 53 which are projected in an axial direction P of the first and second fluid supply/discharge port portions 1A, 2A in order to form the annular grooves 51, annular press portions 12, 22 which are buttable against the peripheral wall end portion 52 on the inner-diameter side are formed on inner-diameter sides of the annular projections 11, 21 on the end faces of the first and second fluid supply/discharge port portions 1A, 2A, the annular press portions 12, 22 are formed into forward-narrowed annular projections having tapered peripheral faces 12a, 22a in which side peripheral faces on sides of the annular press projections are inclined so that valley portions 14, 24 surrounded by the annular press portions and the annular projections 11, 21 have an inward-narrowed shape, the peripheral wall end portion 52 on the inner-diameter side is formed into a forward-narrowed annular projection which has a tapered peripheral face 52a butting against the tapered peripheral faces 12a, 22a of the annular press portions 12, 22, and which is enterable into the valley portions 14, 24, the first fluid supply/discharge port portion 1A and the second fluid supply/discharge port portion 2A are attracted to each other via the gasket G, whereby the annular projection 11 of the first fluid supply/discharge port portion 1A and the annular groove 51 of one end of the gasket G, and the annular projection 21 of the second fluid supply/discharge port portion 2A and the annular groove 51 of another end of the gasket G are fitted respectively to each other, and the tapered peripheral faces 12a, 22a of the annular press portions 12, 22 are press contacted with the tapered peripheral face 52a of the peripheral wall end portion 52 on the inner-diameter side to form a sealing portion S1.

The invention of claim 2 is characterized in that, in the connecting structure for an integration panel and a fluid device set forth in claim 1, inclination angles of the tapered peripheral faces 12a, 22a of the annular press portions 12, 22 are set to be different from an inclination angle of the tapered peripheral face 52a of the peripheral wall end portion 52 on the inner-diameter side so that it is configured by a press contact only between end portions of the tapered peripheral faces 12a, 22a of the annular press portions 12, 22 and the tapered peripheral face 52a of the peripheral wall end portion 52 on the inner-diameter side, the end portion being on a side which is radially remote from the annular projections 11, 21.

The invention of claim 3 is characterized in that, in the connecting structure for an integration panel and a fluid device set forth in claim 1 or 2, projection amounts of the annular projections 11, 21 in the direction of the axis P are set to be larger than projection amounts of the annular press portions 12, 22 in the direction of the axis P.

The invention of claim 4 is characterized in that, in the connecting structure for an integration panel and a fluid device set forth in any one of claims 1 to 3, a state is configured where the peripheral wall end portion 52 on the inner-diameter side is expandingly displaced to be press contacted with the annular projections 11, 21 to form a sealing portion S2, by a component force caused by attracting the first fluid supply/discharge port portion 1A and the second fluid supply/discharge port portion 2A via the gasket G to cause the both tapered peripheral faces 12a, 22a, 52a to be in press contact with each other.

The invention of claim 5 is characterized in that, in the connecting structure for an integration panel and a fluid device set forth in any one of claims 1 to 4, the gasket G has a substantially H-like section shape.

The invention of claim 6 is characterized in that, in the connecting structure for an integration panel and a fluid device set forth in any one of claims 1 to 5, in order to facilitate insertion of the annular projections 11, 21 into the annular grooves 51, the annular projections 11, 21 are formed into a tapered section shape in which an inner peripheral edge and/or outer peripheral edge of a tip end is chamfered.

The invention of claim 7 is characterized in that, in the connecting structure for an integration panel and a fluid device set forth in any one of claims 1 to 6, holding means I for holding the joined state where the sealing portion S1 is formed is equipped.

The invention of claim 8 is characterized in that, in the connecting structure for an integration panel and a fluid device set forth in claim 7, the holding means I performs an attracting function of attracting the first fluid supply/discharge port portion 1A and the second fluid supply/discharge port portion 2A to obtain the joined state.

The invention of claim 9 is a connecting structure for an integration panel and a fluid device, wherein when a first fluid supply/discharge port portion 1A of an integration panel 1 having the first fluid supply/discharge port portion 1A where a pipe-like fluid passage 3 or an annular fluid passage, and one or more annular fluid passages 4 are concentrically formed and opened, and a second fluid supply/discharge port portion 2A of a fluid device 2 having the second fluid supply/discharge port portion 2A where a pipe-like fluid passage 7 or an annular fluid passage, and one or more annular fluid passages 8 are concentrically formed and opened are to be communicatingly connected to each other in a state where respective ones of the plural fluid passages 3, 4, 7, 8 correspond to each other, and are sealed by plural ring-like gaskets G1, G2 interposed between the first fluid supply/discharge port portion 1A and the second fluid supply/discharge port portion 2A, in the first fluid supply/discharge port portion 1A and the second fluid supply/discharge port portion 2A, annular projections 21, 11, 41, 31 are formed on outer-diameter portions of the fluid passages 3, 4, 7, 8 which are opened in end faces, the gaskets G1, G2 are configured by flexible materials having: fluid paths W1, W2 which are formed to allow the corresponding fluid passages 3, 4, 7, 8 of the first and second fluid supply/discharge port portions 1A, 2A to communicate with each other; a pair of annular grooves 51, 61 which are formed on outer-diameter portions of the fluid paths W1, W2 to be fitted respectively to the annular projections 21, 11, 41, 31 formed on the end faces of the first and second fluid supply/discharge port portions 1A, 2A; and peripheral wall end portions 52, 53, 62, 63 on the inner- and outer-diameter sides which are projected in an axial direction of the first and second fluid supply/discharge port portions 1A, 2A in order to form the annular grooves 51, 61, annular press portions 22, 23, 12, 13, 42, 43, 32, 33 which are buttable respectively against the peripheral wall end portions 52, 53, 62, 63 on the inner- and outer-diameter sides are formed on the inner- and outer-diameter sides of the annular projections 21, 11, 41, 31 on the end faces of the first and second fluid supply/discharge port portions 1A, 2A, the annular press portions 22, 23, 12, 13, 42, 43, 32, 33 are formed into forward-narrowed annular projections having tapered peripheral faces 22a, 23a, 12a, 13a, 42a, 43a, 32a, 33a in which side peripheral faces on sides of the annular press projections are inclined so that valley portions 24, 25, 14, 15, 44, 45, 34, 35 surrounded by the annular press portions and the annular projections 21, 11, 41, 31 have an inward-narrowed shape, the peripheral wall end portions 52, 53, 62, 63 are formed into forward-narrowed annular projections which have tapered peripheral faces 52a, 53a, 62a, 63a butting against the tapered peripheral faces 22a, 23a, 12a, 13a, 42a, 43a, 32a, 33a of the corresponding annular press portions 22, 23, 12, 13, 42, 43, 32, 33, and which are enterable into the valley portions 24, 25, 14, 15, 44, 45, 34, 35, the first fluid supply/discharge port portion 1A and the second fluid supply/discharge port portion 2A are attracted to each other via the plural gaskets G1, G2, whereby the annular projections 21, 41 of the first fluid supply/discharge port portion 1A and the annular grooves 51, 61 of one ends of the gaskets G1, G2, and the annular projections 11, 31 of the second fluid supply/discharge port portion 2A and the annular grooves 51, 61 of other ends of the gaskets G1, G2 are fitted respectively to each other, and the tapered peripheral faces 22a, 23a, 12a, 13a, 42a, 43a, 32a, 33a of the corresponding annular press portions 22, 23, 12, 13, 42, 43, 32, 33 are press contacted with the tapered peripheral faces 52a, 53a, 62a, 63a of the peripheral wall end portions 52, 53, 62, 63 to form a sealing portion S1, and in the gaskets G1, G2, an intermediate gasket G1 in which the fluid passages W1, W2 exist on both inner- and outer-diameter sides in the joined state is formed in a state where an outer peripheral face 55a of the gasket is a wall for forming an annular fluid path W2 through which the annular fluid passage 8 of the first fluid supply/discharge port portion 1A existing on the outer-diameter side of the intermediate gasket G1 communicates with the annular fluid passage 4 of the second fluid supply/discharge port portion 2A.

The invention of claim 10 is characterized in that, in the connecting structure for an integration panel and a fluid device set forth in claim 9, inclination angles of the tapered peripheral faces 22a, 23a, 12a, 13a, 42a, 43a, 32a, 33a of the annular press portions 22, 23, 12, 13, 42, 43, 32, 33 are set to be different from inclination angles of the tapered peripheral faces 52a, 53a, 62a, 63a of the peripheral wall end portions 52, 53, 62, 63 so that the sealing portion S1 is configured by a press contact only between end portions of the tapered peripheral faces 22a, 23a, 12a, 13a, 42a, 43a, 32a, 33a of the annular press portions 22, 23, 12, 13, 42, 43, 32, 33 and the tapered peripheral faces 52a, 53a, 62a, 63a of the peripheral wall end portions 52, 53, 62, 63, the end portions being on a side which is radially remote from the annular projections 21, 11, 41, 31.

The invention of claim 11 is characterized in that, in the connecting structure for an integration panel and a fluid device set forth in claim 9 or 10, projection amounts of the annular projections 21, 11, 41, 31 in the direction of the axis are set to be larger than projection amounts of the annular press portions 22, 23, 12, 13, 42, 43, 32, 33 in the direction of the axis.

The invention of claim 12 is characterized in that, in the connecting structure for an integration panel and a fluid device set forth in any one of claims 9 to 11, a state is configured where the peripheral wall end portions 52, 62 on the inner-diameter side are diameter-increasing displaced, and the peripheral wall end portions 53, 63 on the outer-diameter side are diameter-decreasing displaced to be press contacted with the annular projections 21, 41, 11, 31 to form a secondary sealing portion S2, by a component force caused by attracting the first fluid supply/discharge port portion 1A and the second fluid supply/discharge port portion 2A via the plural gaskets G1, G2 to cause the both tapered peripheral faces 22a, 23a, 12a, 13a, 42a, 43a, 32a, 33a, 52a, 53a, 62a, 63a to be in press contact with each other.

The invention of claim 13 is characterized in that, in the connecting structure for an integration panel and a fluid device set forth in any one of claims 9 to 12, the plural gaskets G1, G2 have a substantially H-like section shape.

The invention of claim 14 is characterized in that, in the connecting structure for an integration panel and a fluid device set forth in any one of claims 9 to 13, in order to facilitate insertion of the annular projections 21, 11, 41, 31 into the annular grooves 51, 61, the annular projections 21, 11, 41, 31 are formed into a tapered section shape in which an inner peripheral edge and/or outer peripheral edge of a tip end is chamfered.

The invention of claim 15 is characterized in that, in the connecting structure for an integration panel and a fluid device set forth in any one of claims 9 to 14, holding means I for holding the joined state where the sealing portion S1 is formed is equipped.

The invention of claim 16 is characterized in that, in the connecting structure for an integration panel and a fluid device set forth in claim 15, the holding means I performs an attracting function of attracting the first fluid supply/discharge port portion 1A and the second fluid supply/discharge port portion 2A to obtain the joined state.

EFFECTS OF THE INVENTION

According to the invention of claim 1, when the first and second fluid supply/discharge port portions are attracted to each other, the annular projections formed respectively on the fluid supply/discharge port portions, and the annular grooves formed respectively in the one and other end faces of the gasket are fitted to each other by relative movement in the axial direction, whereby a guiding function is exerted, the first and second fluid supply/discharge port portions relatively approach each other in a satisfactory manner without causing positional displacement, and the joined state where the annular press portions which are formed on the inner-diameter sides of the annular projections in the fluid supply/discharge port portions are press contacted with the peripheral wall end portion on the inner-diameter side of the gasket as desired is obtained. In the joined state, the tapered peripheral faces of the annular press portions and the peripheral wall end portion on the inner-diameter side are press contacted with each other to form the sealing portion, i.e., an independent sealing portion on the inner-diameter side of the fitting portion between the annular projections and the annular grooves is formed. By the sealing portion, the first and second fluid supply/discharge port portions can be connected to each other in a state where liquid leakage from the connecting portion between them is surely blocked. Moreover, the fitting portion between the annular projections and the annular grooves which exerts the guiding function exerts a labyrinth effect, so that it is possible to expect a function of, even when leakage from the sealing portion occurs, causing the leakage liquid to hardly reach the outer-diameter side.

Each of the tapered peripheral faces of the first and second fluid supply/discharge port portions is angled in a state where the side of the annular projection is retracted (recessed) in the axial direction, and hence press contacted not only in the axial direction but also in a radial direction. Therefore, the reduction of the press contact force of the sealing portion in the case where the pressure in the axial direction is lowered by a reason such as that the force of attracting the first and second fluid supply/discharge port portions is lowered is gentle.

Even when the press contact force is somewhat lowered, consequently, the sealing function is maintained. This is an effect that is apparently more advantageous than a conventional structure in which press contact is performed simply in the axial direction. By a radial component force due to the tapered peripheral face, a force in a direction along which the width of the annular groove is narrowed is produced. Also, there is an advantage that the fitting between the annular groove and the annular projection is tightened by the formation of the sealing portion, and the function of locking the fluid supply/discharge port portions with the gasket is enhanced.

As a result, it is possible to provide a connecting structure for an integration panel and a fluid device in which an excellent sealed state is surely obtained by the guiding function, an excellent sealing property can be held even when substantially no further fastening is performed, the reliability is superior, and the assembling workability is improved. When this connecting structure is used in a piping system for a cleaning apparatus in a semiconductor device producing facility, for example, the occupation area of the apparatus can be reduced while ensuring an excellent sealing property, and hence the structure is advantageous from the viewpoint of cost. Furthermore, a large fluid path can be ensured, and hence the circulating flow amount can be increased, and the purities of chemicals can be made higher, thereby attaining an effect that the invention can contribute to improvement of the yield.

According to the invention of claim 2, the sealing portion is in the state where only the end portion (inner-most-diameter side end) that is radially remote from the annular groove is press contacted, and hence a sure sealing function is obtained by a higher surface pressure. This prevents a fluid from entering between the tapered peripheral faces. Therefore, it is possible to provide a connecting structure for an integration panel and a fluid device which has an advantage that a disadvantage that a fluid itself or a mixture or foreign material in the fluid enters and stagnates to lower the purity of the fluid does not occur.

According to the invention of claim 3, in accordance with of the operation of attracting the first and second fluid supply/discharge port portions, sequencing is performed so that the annular projections first enter into the annular grooves, and thereafter the tapered peripheral faces butt against each other. Therefore, the guiding function due to the fitting of the annular projections and the annular grooves is surely exerted. As a result, there is an advantage that, even when an operation of assembling an integration panel and a fluid device via the gasket is somewhat roughly performed, the sealing portion due to the press contact between the annular press portion and the peripheral wall end portion on the inner-diameter side is configured so as to be surely exerted as desired.

According to the invention of claim 4, in order to form a sealing portion based on a press contact between tapered peripheral faces, it is necessary to strongly press the annular press portion and the peripheral wall end portion against each other. By the pressing force, a component force due to the inclination of the tapered peripheral faces is produced. With respect to the peripheral wall end portion, it is expandingly displaced to be press contacted with the inner-diameter side peripheral face of the annular projection, thereby forming the sealing portion. Because of the structure where the tapered peripheral faces are press contacted with each other, irrespective of the fitting state between the annular projection and the annular groove (press insertion, close fitting where sliding is enabled, fitting including a gap, and the like), a sealing portion is configured also between the peripheral wall end portion on the inner-diameter side and the annular projection. Therefore, the sealing function is further enhanced by the two sealing portions, and it is possible to provide a connecting structure for an integration panel and a fluid device which has a more excellent sealing performance.

According to the invention of claim 5, the gasket is formed into a substantially H-like section shape. Therefore, the design and production of the gasket and the first and second fluid supply/discharge port portions which are portions to be fitted therewith can be simplified as compared with the case of, for example, a lateral T-like shape. Furthermore, a connecting structure which is excellent in balance (strength balance, assembling balance) when fitted to an integration panel and a fluid device can be produced.

According to the invention of claim 6, the tapered section shape in which the inner peripheral edge and/or an outer peripheral edge of each annular projection is chamfered is formed, thereby facilitating insertion of the annular projection into the annular groove. Even in a state where the relative position between the first or second fluid supply/discharge port portion and the gasket is slightly deviated, when they are attracted to each other, therefore, the fitting between the annular projection and the annular groove can be surely performed. As a result, it is possible to provide a preferred connecting structure for an integration panel and a fluid device in which, even when an assembling operation of attracting the first and second fluid supply/discharge port portions via the gasket is somewhat roughly performed, the above-mentioned guiding function due to the fitting between the annular projection and the annular groove can be surely exerted.

According to the invention of claim 7, the holding means can hold the joined state where the fluid supply/discharge port portions are attracted to each other via the gasket. Therefore, it is possible to provide a highly reliable connecting structure for an integration panel and a fluid device in which the state where liquid leakage does not occur in the integration panel and the fluid device, and the excellent sealing property can be held for a long term. As a result, it is possible to further enhance the function and effect that a connecting structure for an integration panel and a fluid device in which an excellent sealing property can be held even when substantially no further fastening is performed, and the assembling workability is improved can be provided.

According to the invention of claim 8, the holding means can perform not only holding of the joined state of the first fluid supply/discharge port portion and the second fluid supply/discharge port portion, but also an attracting function of attracting the first fluid supply/discharge port portion and the second fluid supply/discharge port portion to obtain the joined state. Therefore, it is not required to additionally prepare attracting means, and there are advantages that the assembling work can be reduced as a whole, and that the cost can be lowered.

According to the invention of claim 9, means is provided for forming two or more fluid passages as concentric multiplex pipes, thereby compactifying a connecting structure portion as compared with a structure in which plural fluid passages are independently arranged. When the first and second fluid supply/discharge port portions are attracted to each other, the annular projections formed respectively thereon, and the annular grooves formed respectively in the one and other end faces of the gaskets are fitted to each other by axial relative movement in the axial direction, whereby a guiding function is exerted, the first and second fluid supply/discharge port portions relatively approach each other in a satisfactory manner without causing positional displacement, and the joined state where the annular press portions which are formed on the inner- and outer-diameter sides of the annular projections in the fluid supply/discharge port portions are press contacted with the peripheral wall end portions on the inner- and outer-diameter sides of the gasket as desired is obtained.

In the joined state, the tapered peripheral faces of the annular press portions and the peripheral wall end portion are press contacted with each other to form the sealing portion, i.e., independent sealing portions on the inner- and outer-diameter sides of the fitting portion between the annular projections and the annular grooves are formed. By the sealing portion, the first and second fluid supply/discharge port portions can be connected to each other in a state where liquid leakage from the connecting portion between them is surely blocked. Moreover, the fitting portion between the annular projections and the annular grooves which exerts the guiding function exerts a labyrinth effect, so that it is possible to expect a function of, even when leakage from the sealing portion occurs, causing the leakage liquid to hardly reach the inner-diameter side or the outer-diameter side.

When this connecting structure is used in a piping system for a cleaning apparatus in a semiconductor device producing facility, for example, the occupation area of the apparatus can be reduced while ensuring an excellent sealing property, and hence the structure is advantageous from the viewpoint of cost. Furthermore, a large fluid path can be ensured, and hence the circulating flow amount can be increased, and the purities of chemicals can be made higher, thereby attaining an effect that the invention can contribute to improvement of the yield.

Each of the tapered peripheral faces of the first and second fluid supply/discharge port portions is angled in a state where the side of the annular projection is retracted (recessed) in the axial direction, and hence press contacted not only in the axial direction but also in a radial direction. Therefore, the reduction of the press contact force of the sealing portion in the case where the pressure in the axial direction is lowered by a reason such as that the force of attracting the first and second fluid supply/discharge port portions is lowered is gentle.

Even when the press contact force is somewhat lowered, consequently, the sealing function is maintained. This is an effect that is apparently more advantageous than a conventional structure in which press contact is performed simply in the axial direction. By a radial component force due to the tapered peripheral face, a force in a direction along which the width of the annular groove is narrowed is produced. Also, there is an advantage that the fitting between the annular groove and the annular projection is tightened by the formation of the sealing portion, and the function of locking the fluid supply/discharge port portions with the gasket is enhanced.

Moreover, in the intermediate gasket where the fluid passages are formed outside and inside of the gasket, not only the inner peripheral portion of the gasket, but also the outer peripheral portion functions also as a wall of a fluid path. Therefore, inner and outer fluid passages which are adjacent to each other are separated only by the thickness of the intermediate gasket, and plural fluid passages can be placed closely in a radial direction as far as possible. Accordingly, there is an advantage that the connecting structure for an integration panel and a fluid device can be further compactified. As a result, a connecting structure for an integration panel and a fluid device in which plural fluid passages are concentrically arranged and connected can be realized. Therefore, the invention can contribute to promotion of integration of fluid devices which can be advantageously modularized or compactified, and provide a connecting structure for an integration panel and a fluid device in which an excellent sealing property can be held for a long term, the reliability is high, and further compactification is enabled.

According to the invention of claim 10, the sealing portion is in the state where only the end portion (the innermost-diameter side end on the inner-diameter side, and the outermost-diameter side end on the outer-diameter side) that is radially remote from the annular groove is press contacted, and hence a sure sealing function is obtained by a higher surface pressure. This prevents a fluid from entering between the tapered peripheral faces. Therefore, it is possible to provide a connecting structure for an integration panel and a fluid device which has an advantage that a disadvantage that a fluid itself or a mixture or foreign material in the fluid enters and stagnates to lower the purity of the fluid does not occur.

According to the invention of claim 11, in accordance with of the operation of attracting the first and second fluid supply/discharge port portions, sequencing is performed so that the annular projections first enter into the annular grooves, and thereafter the tapered peripheral faces butt against each other. Therefore, the guiding function due to the fitting of the annular projections and the annular grooves is surely exerted. As a result, there is an advantage that, even when an operation of assembling an integration panel and a fluid device via the gasket is somewhat roughly performed, the sealing portion due to the press contact between the annular press portion and the peripheral wall end portion on the inner- and outer-diameter sides is configured so as to be surely exerted as desired.

According to the invention of claim 12, in order to form a sealing portion based on a press contact between tapered peripheral faces, it is necessary to strongly press the annular press portion and the peripheral wall end portion against each other. By the pressing force, a component force due to the inclination of the tapered peripheral faces is produced. The peripheral wall end portion on the inner-diameter side is diameter-increasing displaced, and the peripheral wall end portion on the outer-diameter side is diameter-decreasing displaced to be press contacted with the side peripheral faces on the inner- and outer-diameter sides of the annular projection, thereby forming the inner and outer secondary sealing portions. Because of the structure where the tapered peripheral faces are press contacted with each other, irrespective of the fitting state between the annular projection and the annular groove (press insertion, close fitting where sliding is enabled, fitting including a gap, and the like), sealing portions are configured also between the peripheral wall end portions on the inner- and outer-diameter sides and the annular projection. Therefore, the sealing function is further enhanced by the sealing portion and the secondary sealing portions, and it is possible to provide a connecting structure for an integration panel and a fluid device which has a more excellent sealing performance.

According to the invention of claim 13, the gasket is formed into a substantially H-like section shape. Therefore, the design and production of the gasket and the first and second fluid supply/discharge port portions which are portions to be fitted therewith can be simplified as compared with the case of, for example, a lateral T-like shape. Furthermore, a connecting structure which is excellent in balance (strength balance, assembling balance) when fitted to an integration panel and a fluid device can be produced.

According to the invention of claim 14, the tapered section shape in which the inner peripheral edge and/or an outer peripheral edge of each annular projection is chamfered is formed, thereby facilitating insertion of the annular projection into the annular groove. Even in a state where the relative position between the first or second fluid supply/discharge port portion and the gasket is slightly deviated, when they are attracted to each other, therefore, the fitting between the annular projection and the annular groove can be surely performed. As a result, it is possible to provide a preferred connecting structure for an integration panel and a fluid device in which, even when an assembling operation of attracting the first and second fluid supply/discharge port portions via the plural gaskets is somewhat roughly performed, the above-mentioned guiding function due to the fitting between the annular projection and the annular groove can be surely exerted.

According to the invention of claim 15, the holding means can hold the joined state where the fluid supply/discharge port portions are attracted to each other via the gasket. Therefore, it is possible to provide a highly reliable connecting structure for an integration panel and a fluid device in which the state where liquid leakage does not occur in the integration panel and the fluid device, and the excellent sealing property can be held for a long term. As a result, it is possible to further enhance the function and effect that a connecting structure for an integration panel and a fluid device can be provided which can contribute to promotion of integration of fluid devices that can be advantageously modularized or compactified, and in which an excellent sealing property can be held for a long term, the reliability is high, and further compactification is enabled.

According to the invention of claim 16, the holding means can perform not only holding of the joined state of the first fluid supply/discharge port portion and the second fluid supply/discharge port portion, but also an attracting function of attracting the first fluid supply/discharge port portion and the second fluid supply/discharge port portion to obtain the joined state. Therefore, it is not required to additionally prepare attracting means, and there are advantages that the assembling work can be reduced as a whole, and that the cost can be lowered.

BRIEF DESCRIPTION OF THE DRAWINGS

FIG. 19 is a diagram showing a connection procedure of a connecting structure having the holding means of FIG. 17.

Figure 1:
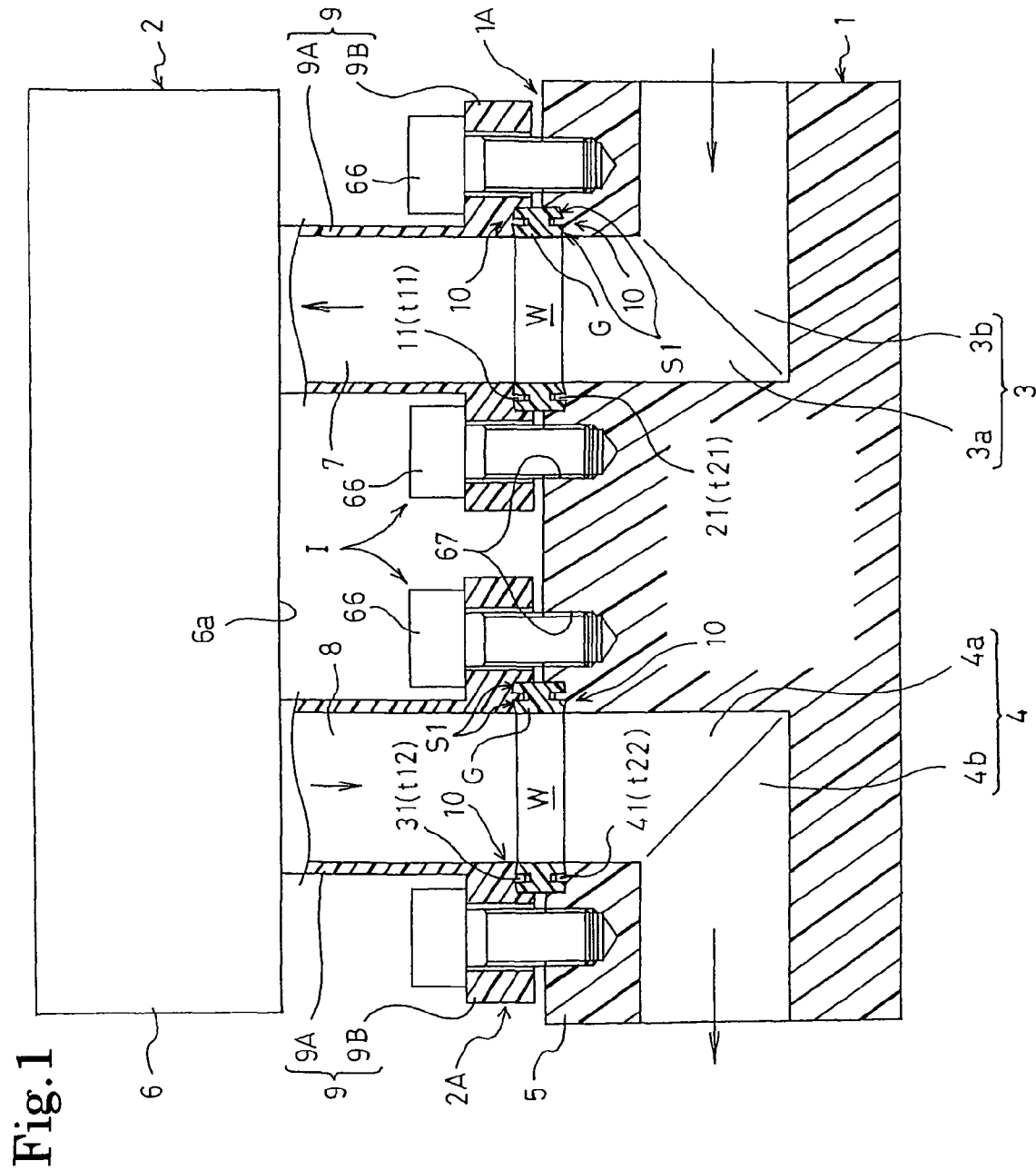
FIG. 1 is a section view (Embodiment 1) showing a connecting structure for an integration panel and a valve.

DESCRIPTION OF REFERENCE NUMERALS 1 integration panel
1A first fluid supply/discharge port portion
1n external thread portion
2 fluid device
2A second fluid supply/discharge port portion
3, 4 fluid passage of integration panel
7, 8 fluid passage of fluid device
9a through hole
10 fitting sealing portion
11, 21, 31, 41 annular projection
12, 13, 22, 23, 32, 33, 42, 43 annular press portion
12a, 13a, 22a, 23a, 32a, 33a, 42a, 43a tapered peripheral face
14, 15, 24, 25, 34, 35, 44, 45 valley portion
51, 61 annular groove
52, 53, 62, 63 peripheral wall end portion
52a, 53a, 62a, 63a tapered peripheral face
55a outer peripheral face of intermediate gasket
66 bolt
67 nut portion
81 cylindrical nut
81n internal thread portion
82 split ring
83 inward flange
83a opening portion
G, G1, G2 gasket
I holding means
P axis
S1 sealing portion
W, W1, W2 fluid path
X, Z center line

BEST MODE FOR CARRYING OUT THE INVENTION

Figure 2:
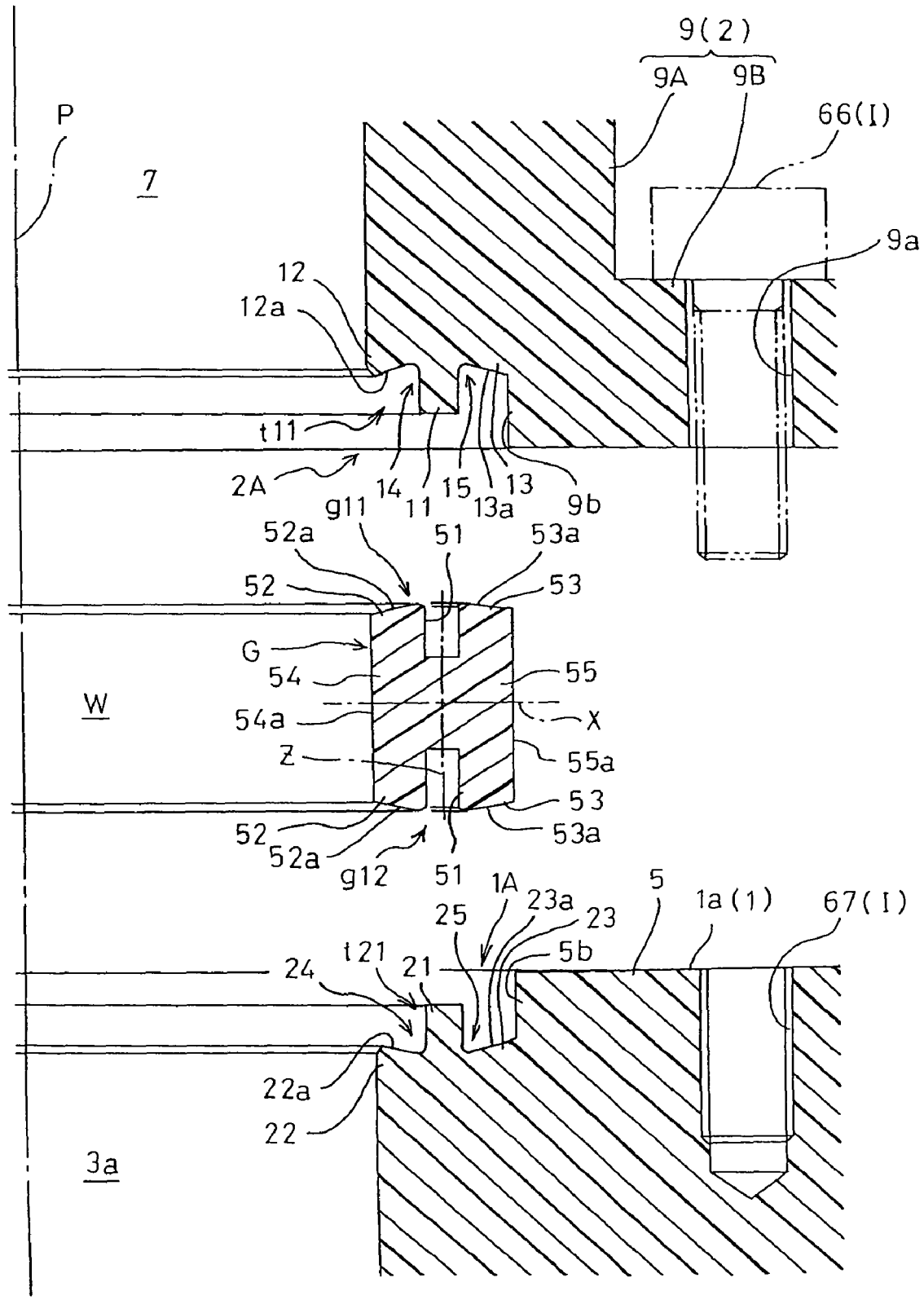
FIG. 2 is a section view of main portions of a gasket which is used in the connecting structure of FIG. 1, and fluid supply/discharge ports.
Figure 3:
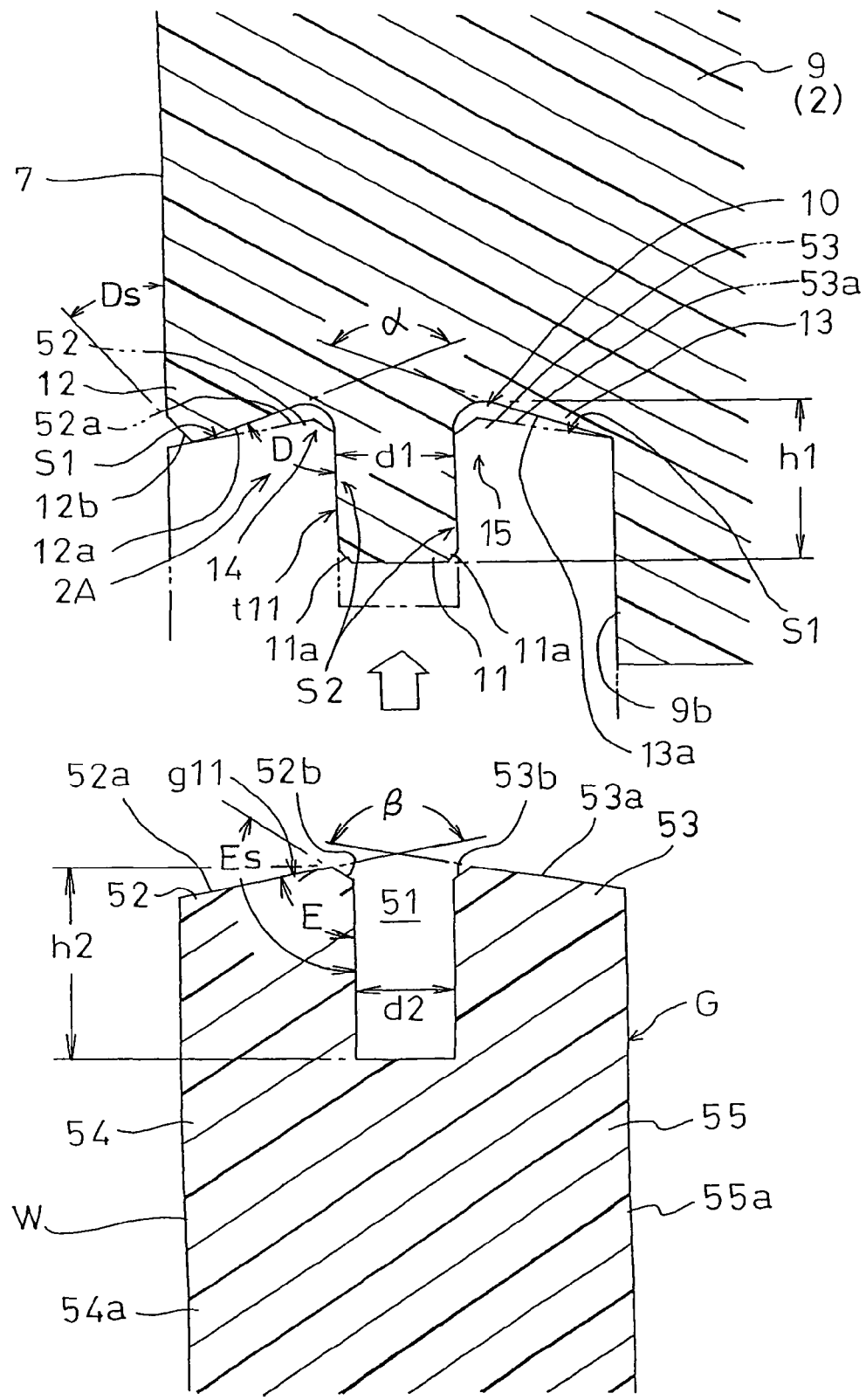
FIG. 3 is an enlarged section view of main portions showing in detail a fitting structure for the gasket and a fluid device.
Figure 4:
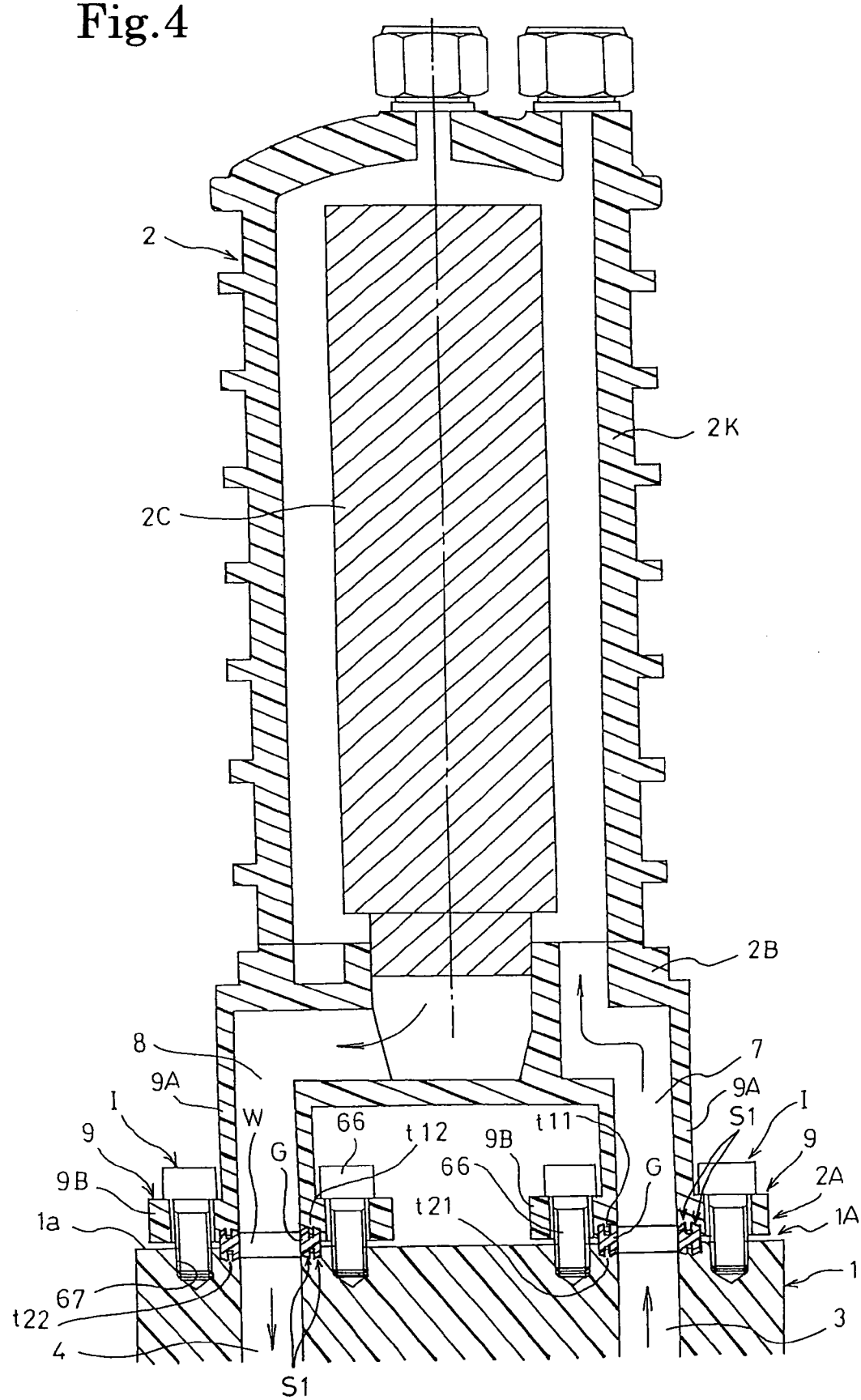
FIG. 4 is a section view (Embodiment 2) showing a connecting structure for an integration panel and a bellows valve.
Figure 5:
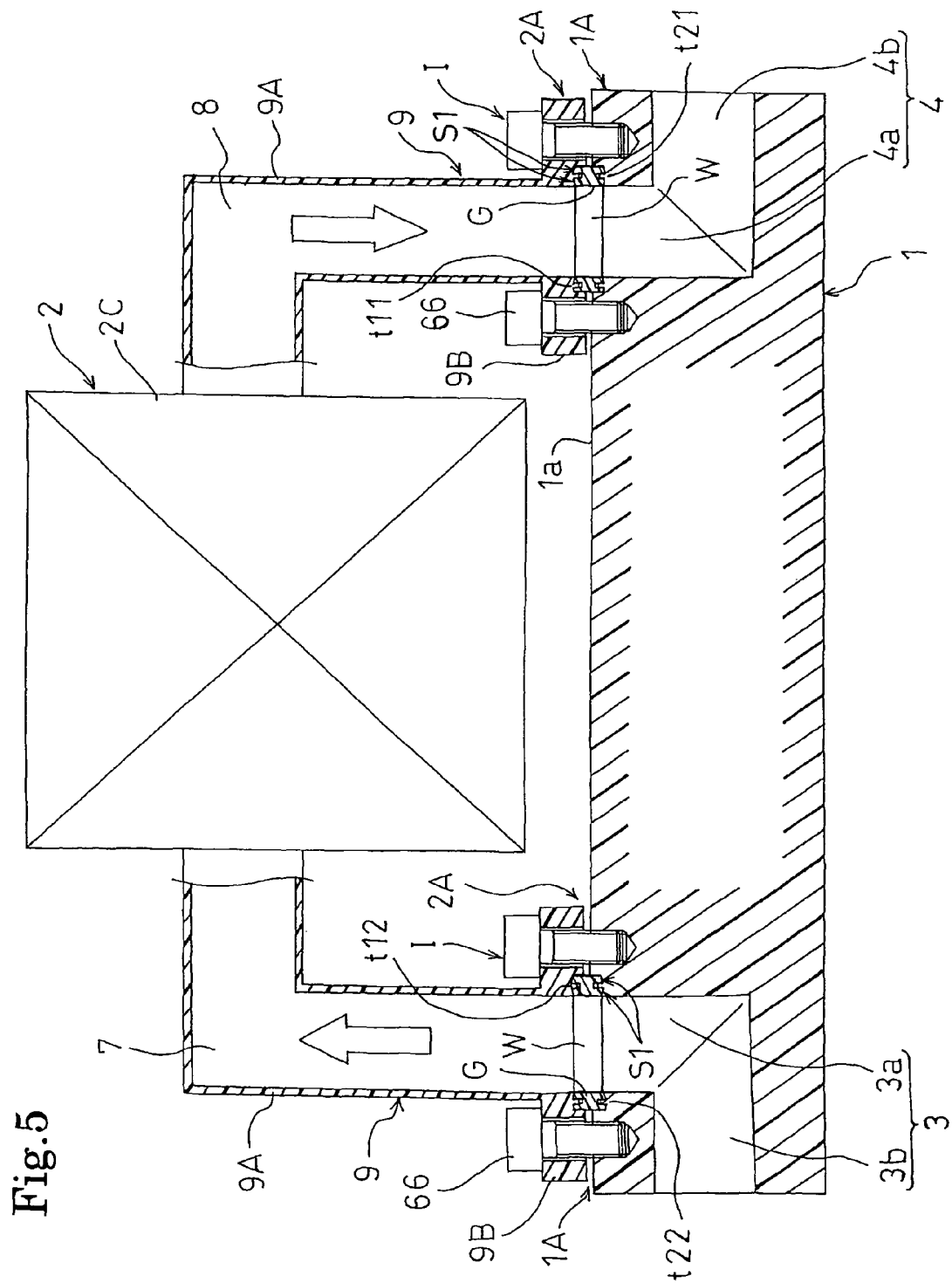
FIG. 5 is a section view (Embodiment 3) showing a connecting structure for an integration panel and a filter.
Figure 6:
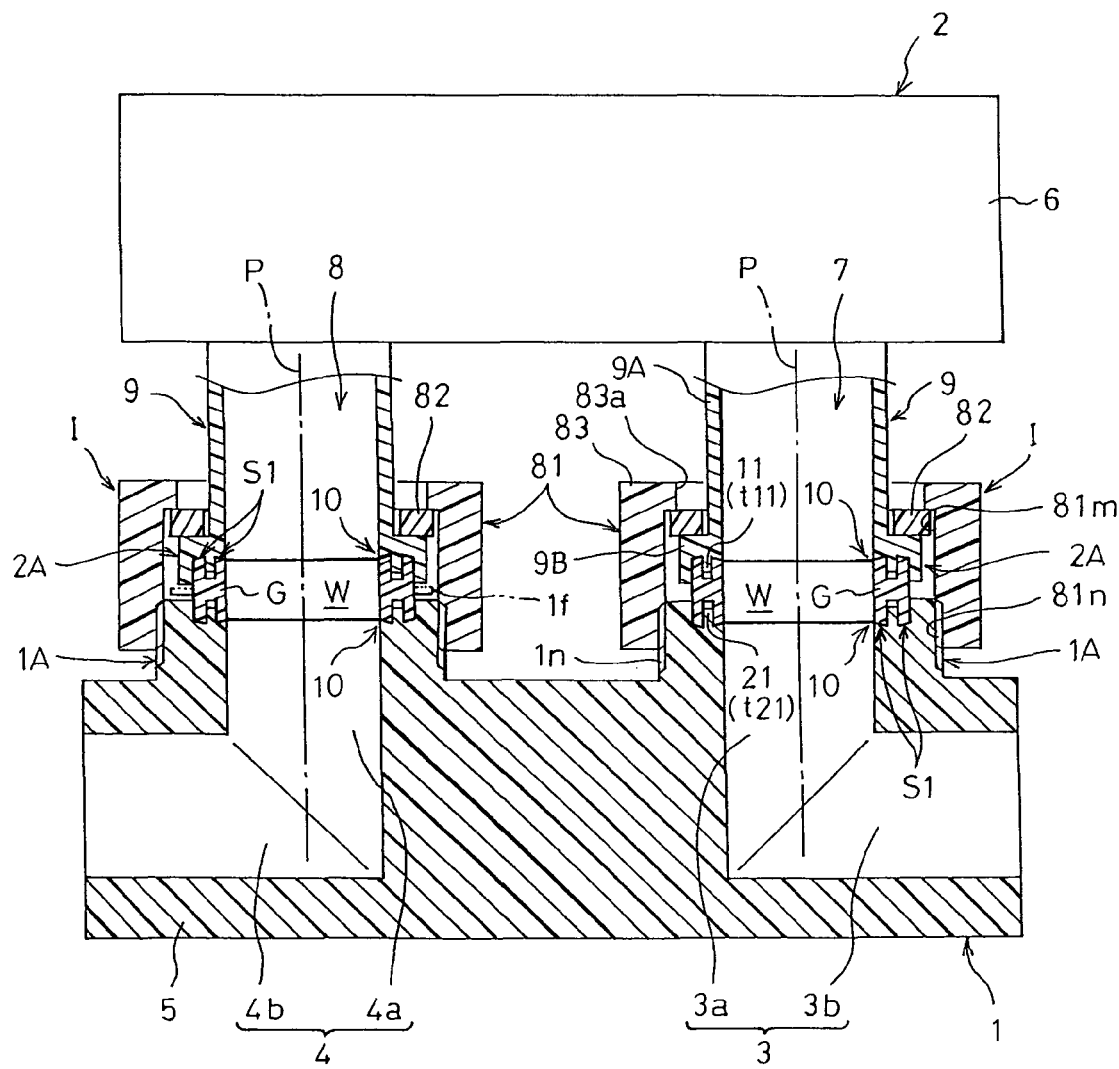
FIG. 6 is a section view (Embodiment 4) of main portions showing a first other structure of holding means having an attracting function.
Figure 7A:
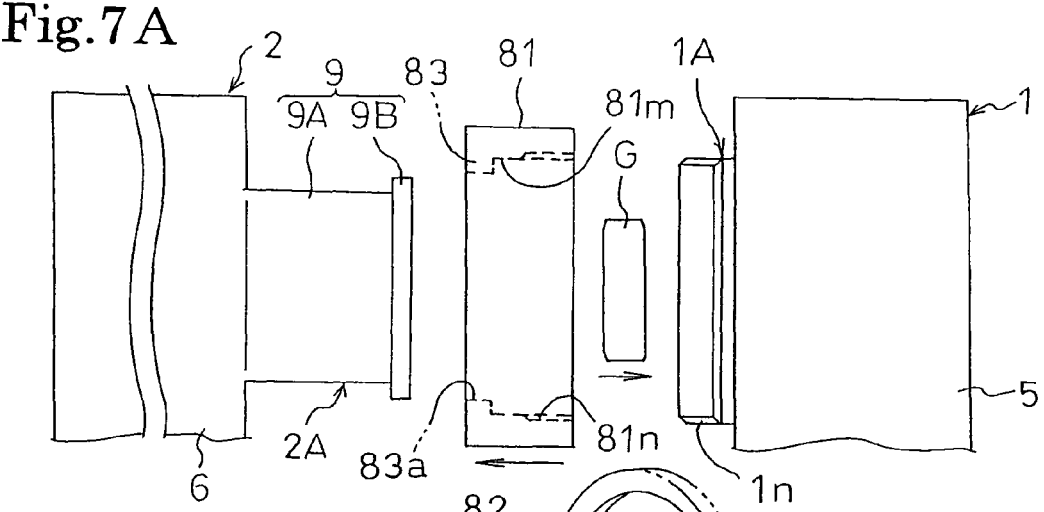
FIG. 7 is a diagram showing a connection procedure of a connecting structure having the holding means of FIG. 6.
Figure 7B:
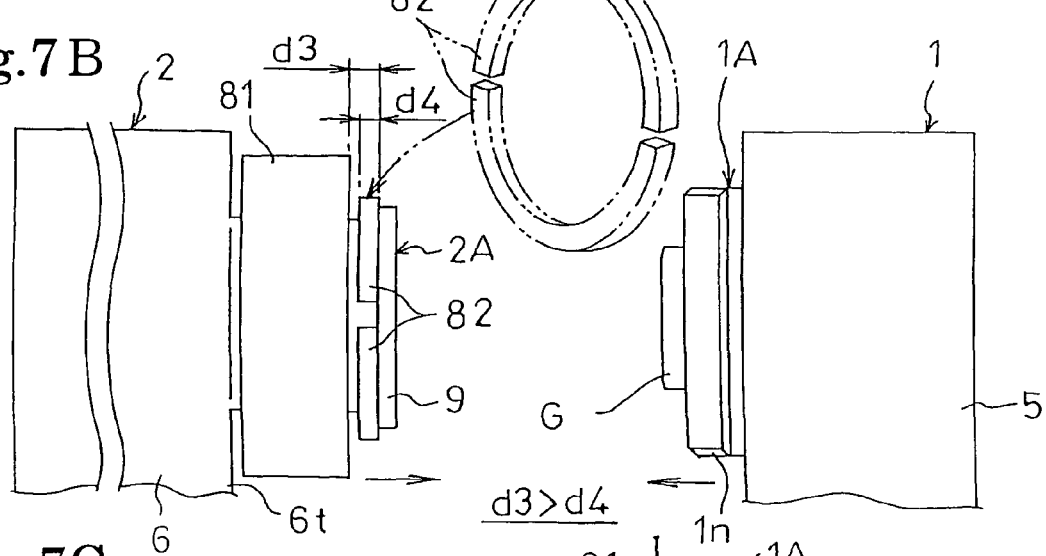
Figure 7C:
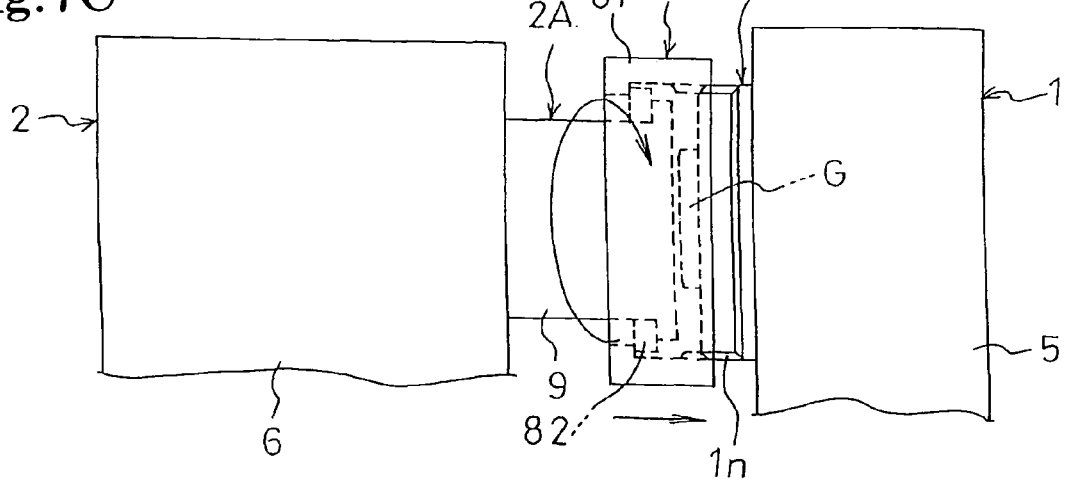
Figure 8:
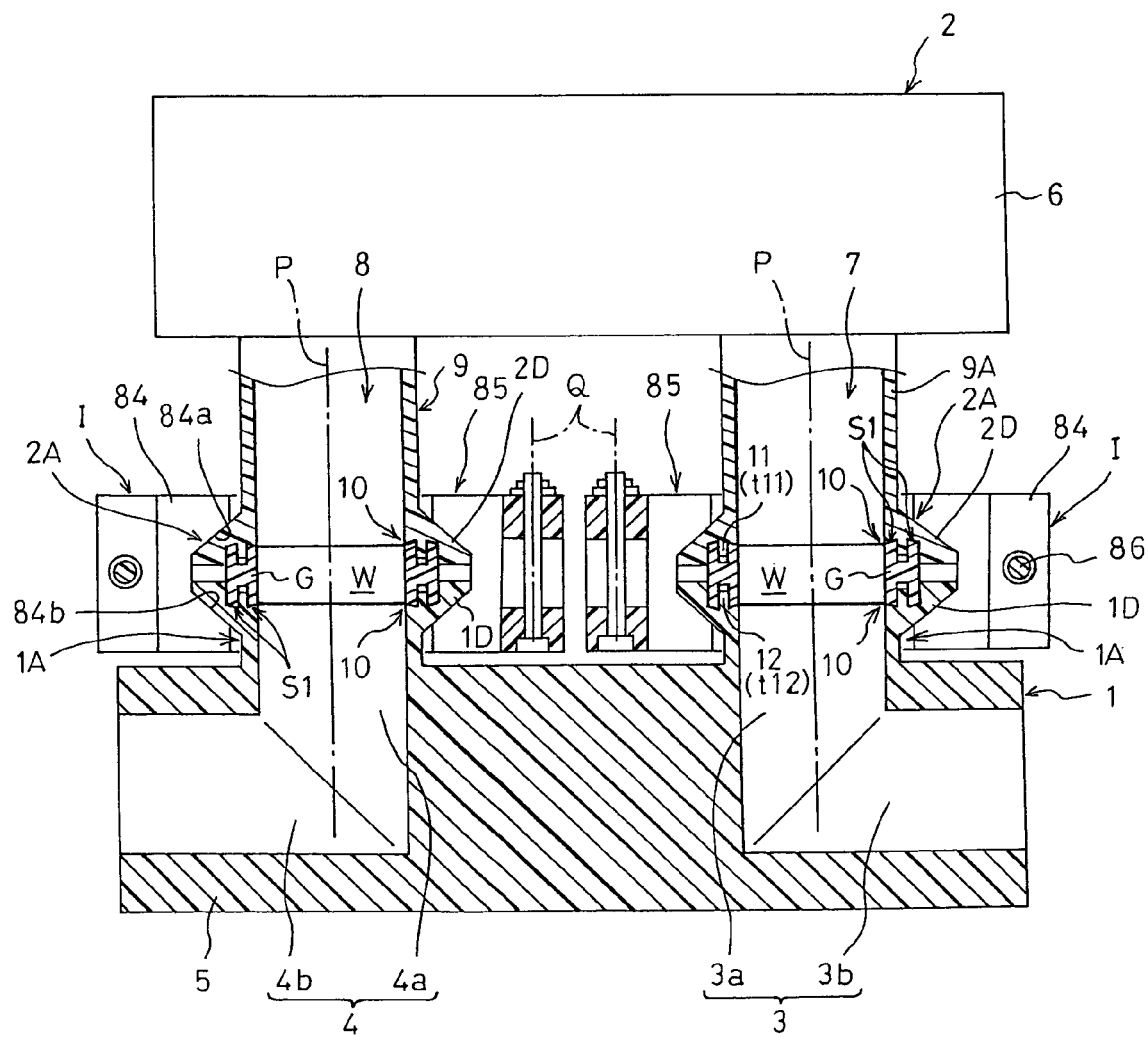
FIG. 8 is a section view (Embodiment 5) of main portions showing a second other structure of holding means having an attracting function.
Figure 9A:
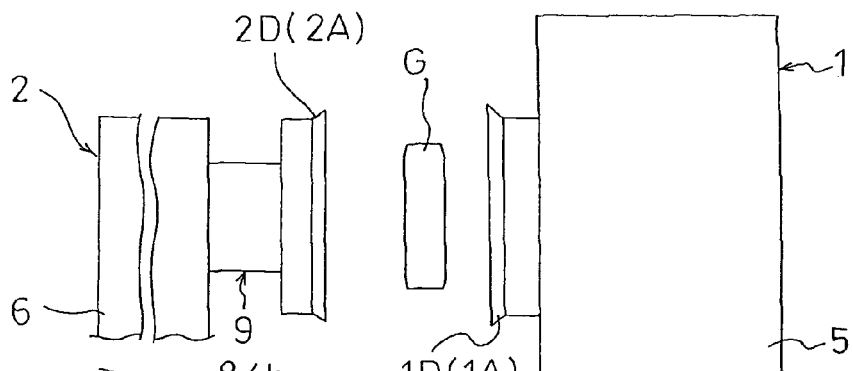
FIG. 9 is a diagram showing a connection procedure of a connecting structure having the holding means of FIG. 8.
Figure 9B:
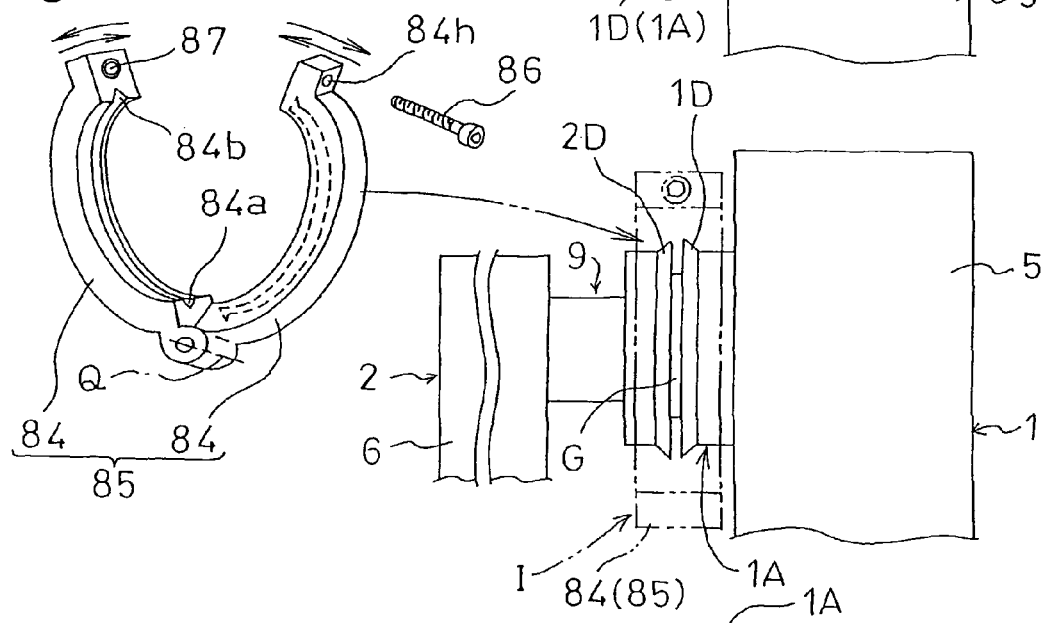
Figure 9C:
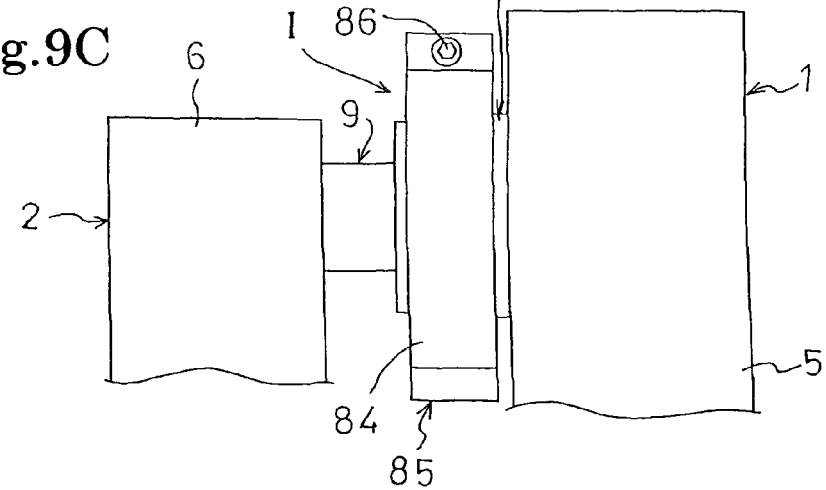
Figure 10:
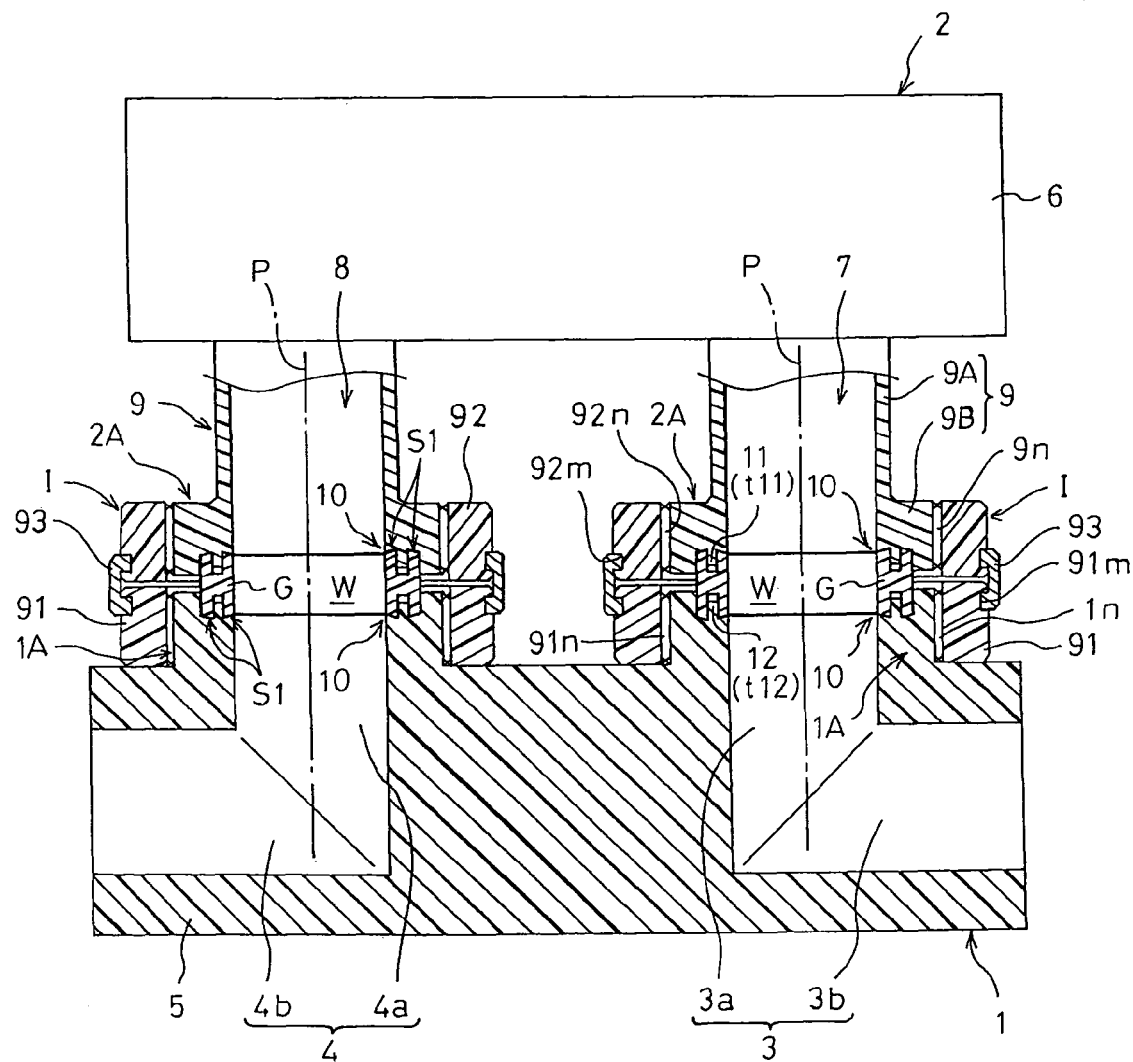
FIG. 10 is a section view (Embodiment 6) of main portions showing a third other structure of holding means having an attracting function.
Figure 11:
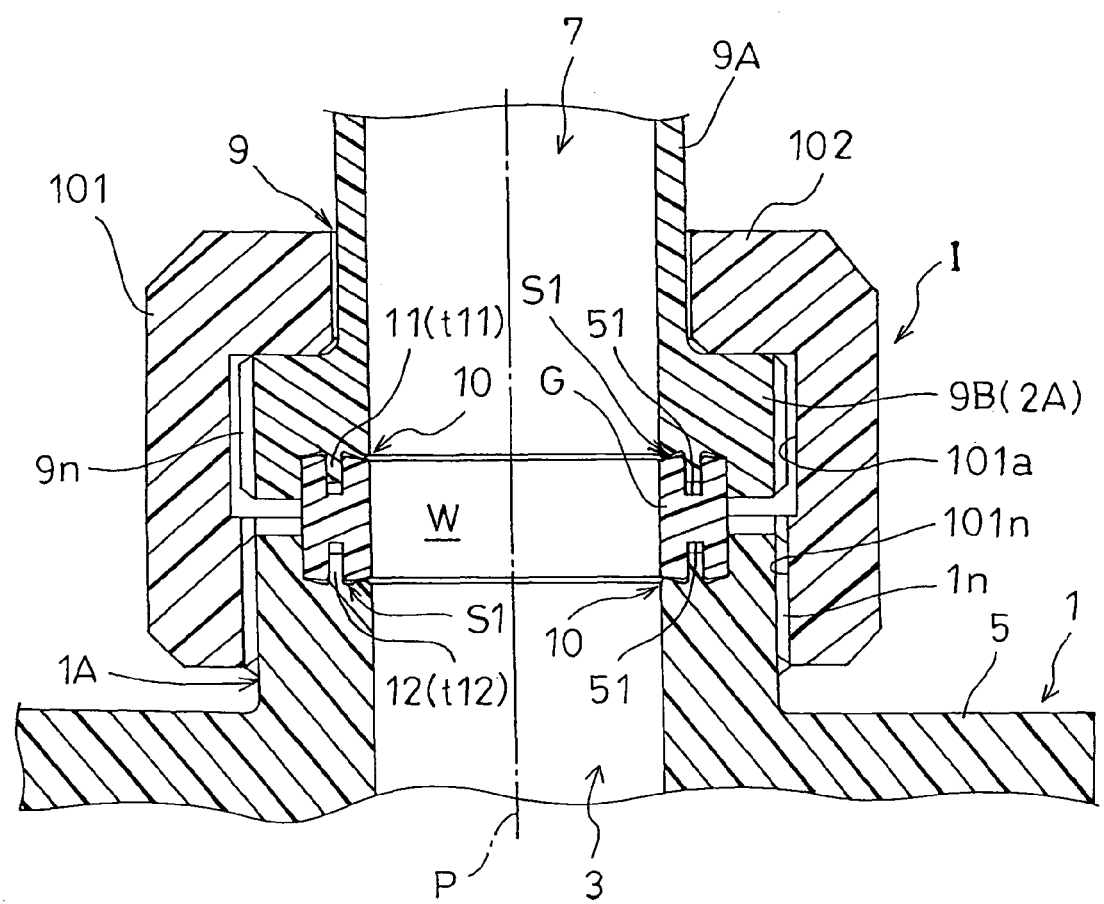
FIG. 11 is a section view (Embodiment 7) of main portions showing a fourth other structure of holding means having an attracting function.
Figure 12:
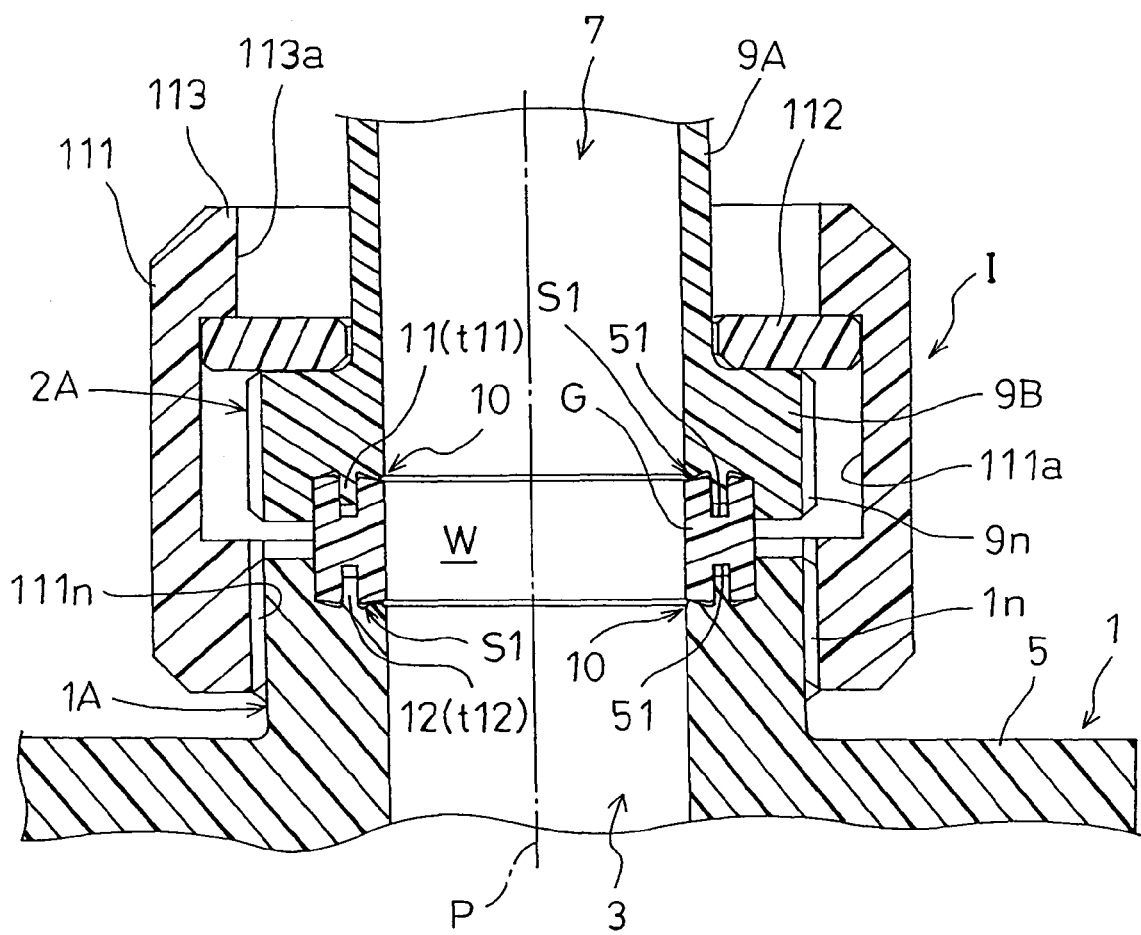
FIG. 12 is a section view (Embodiment 8) of main portions showing a fifth other structure of holding means having an attracting function.
Figure 14:
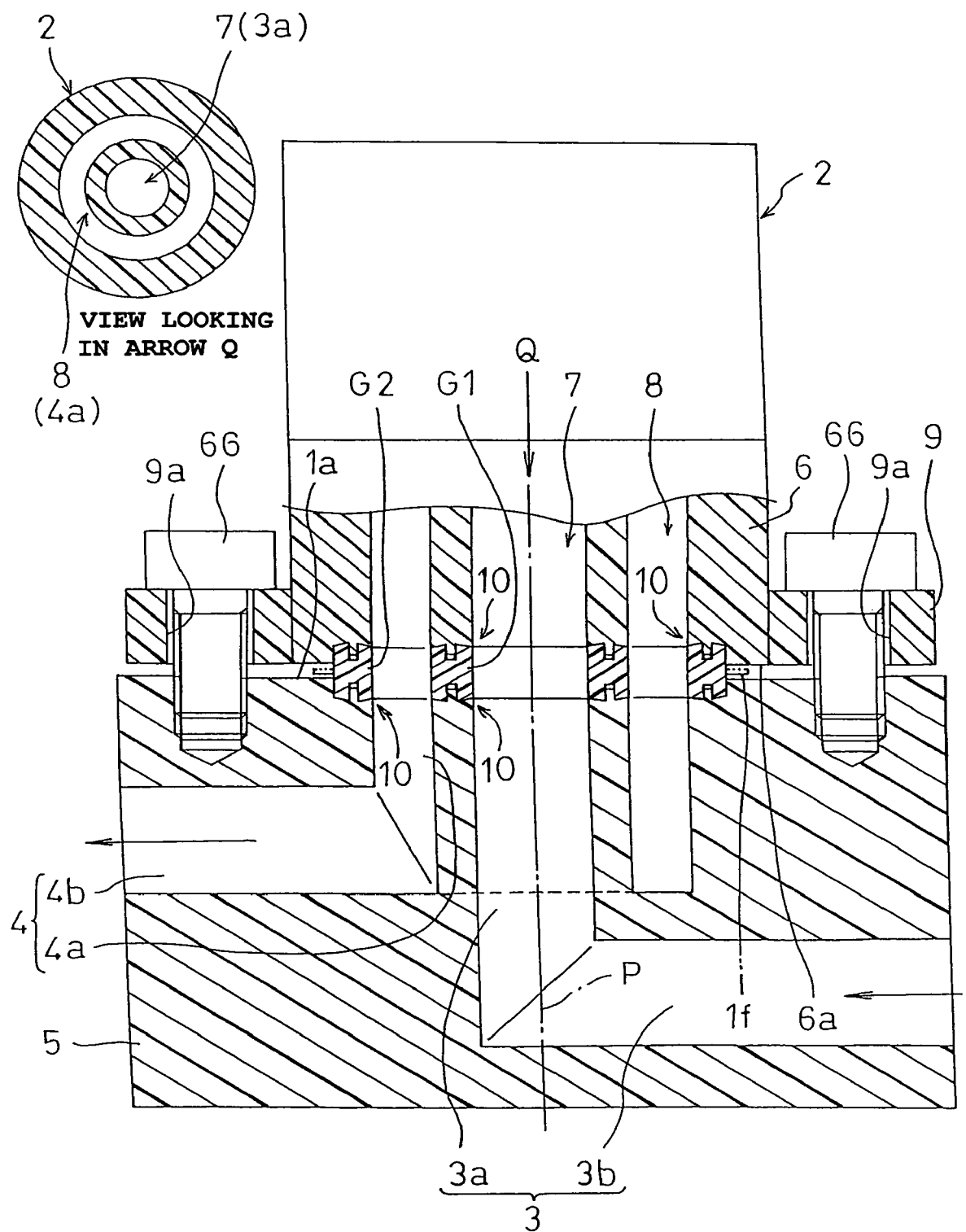
FIG. 14 is a section view (Embodiment 9) showing a concentric multiplex flow path connecting structure for an integration panel and a valve.
Figure 15:
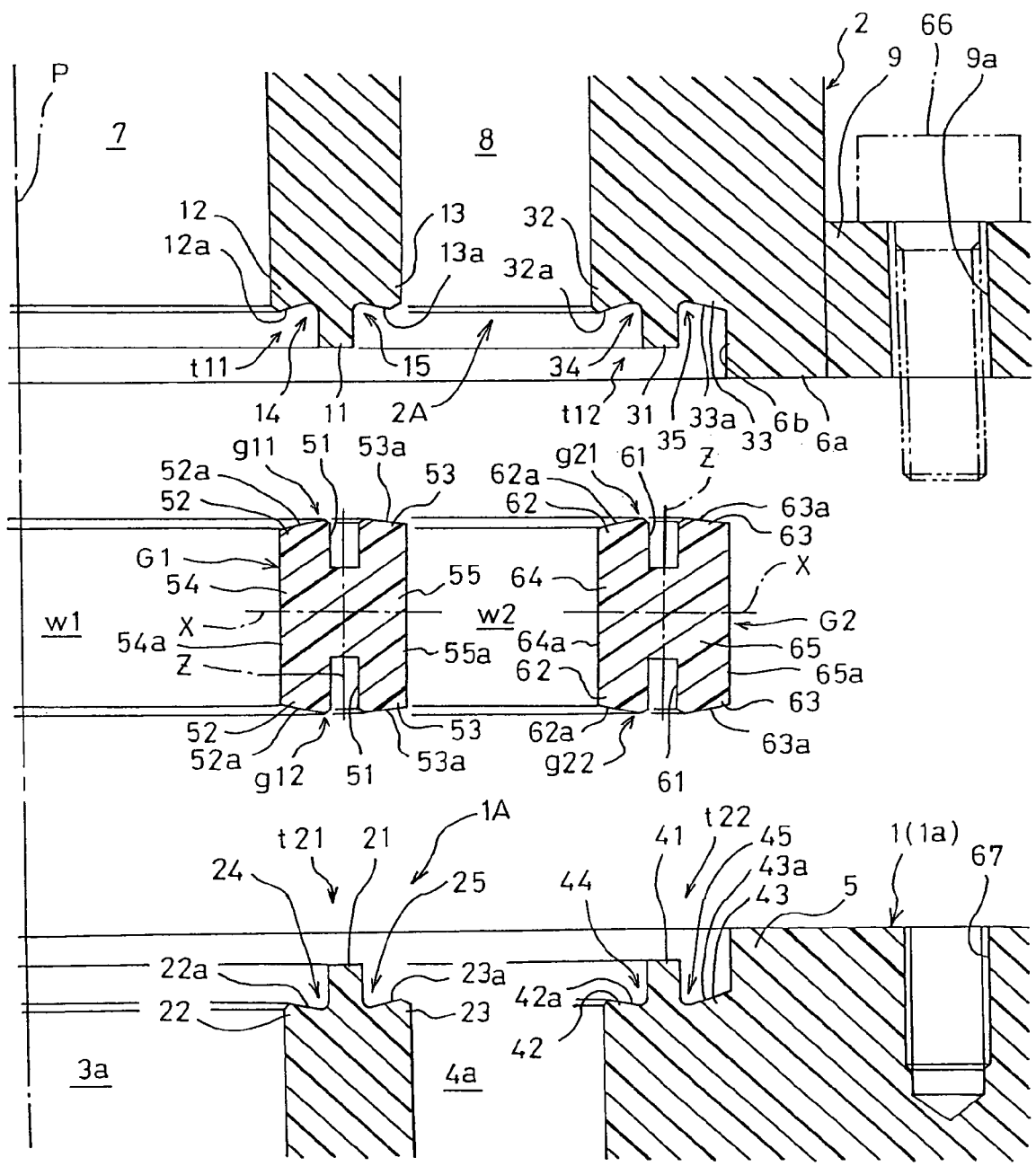
FIG. 15 is a section view of main portions of a gasket which is used in the connecting structure of FIG. 14, and fluid supply/discharge ports.
Figure 16:
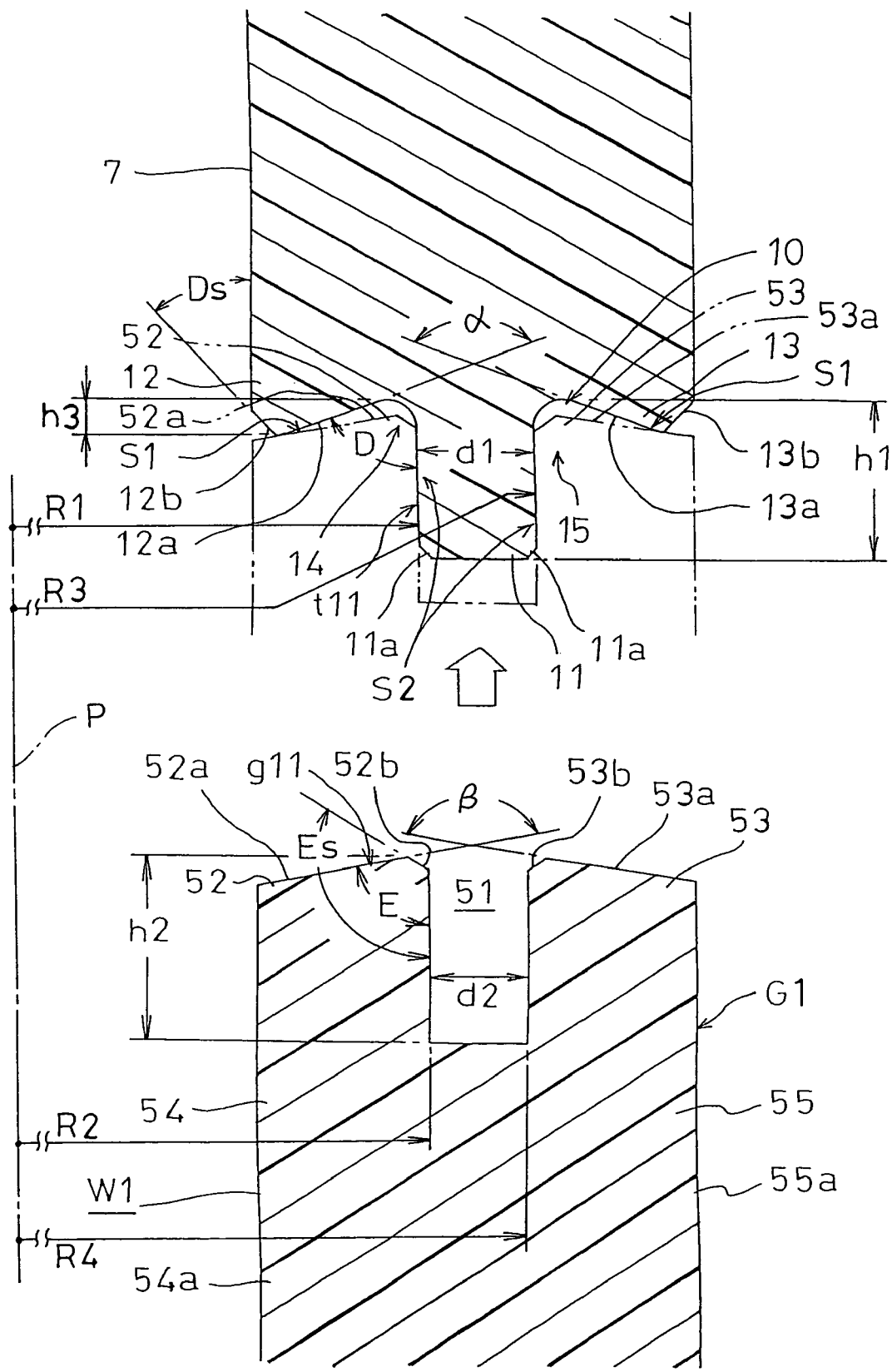
FIG. 16 is an enlarged section view of main portions showing in detail a fitting structure for the gasket and a fluid device.
Figure 17:
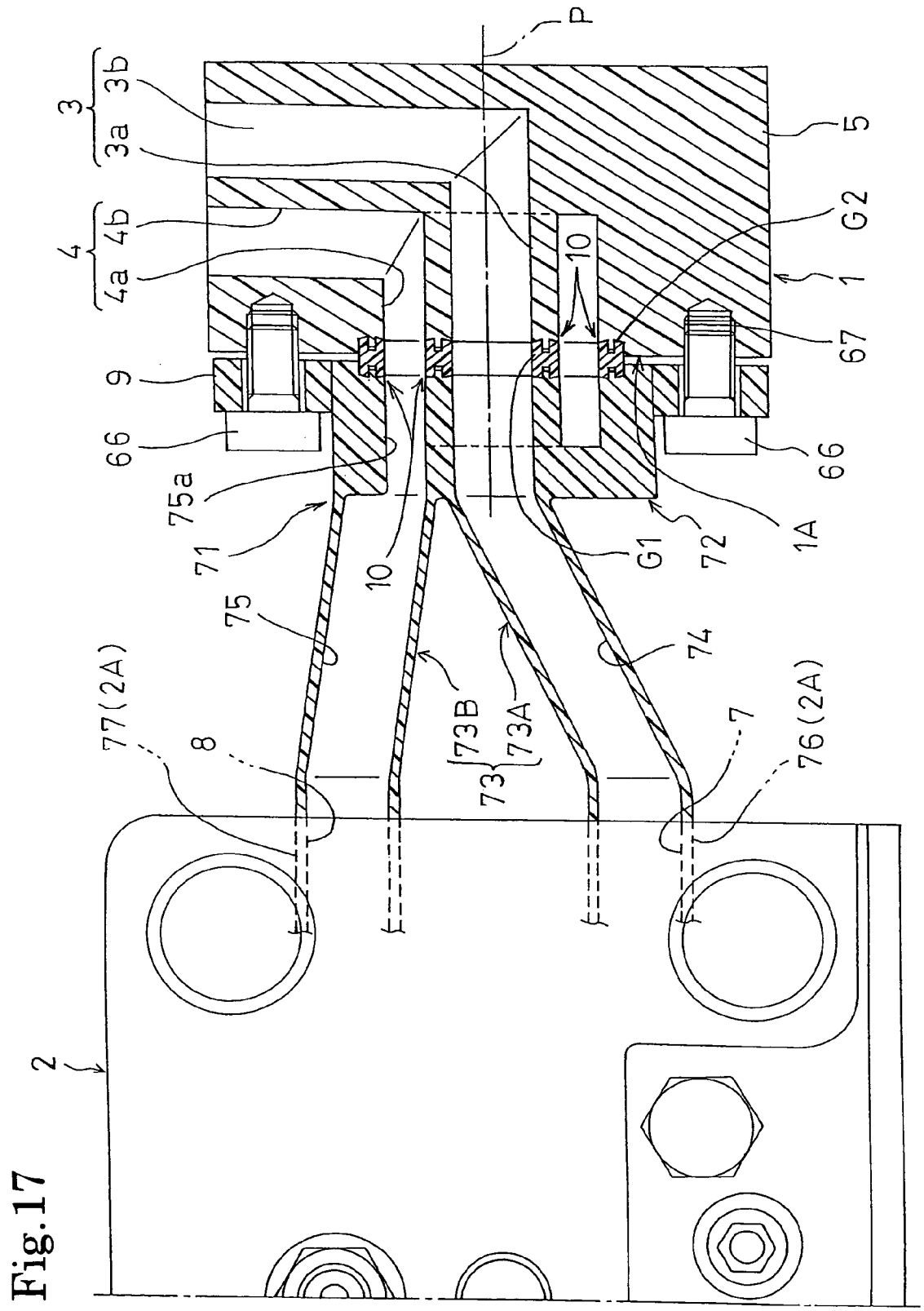
FIG. 17 is a section view (Embodiment 10) showing a concentric multiplex flow path connecting structure for an integration panel and a pump via a flanged pipe.
Figure 18:
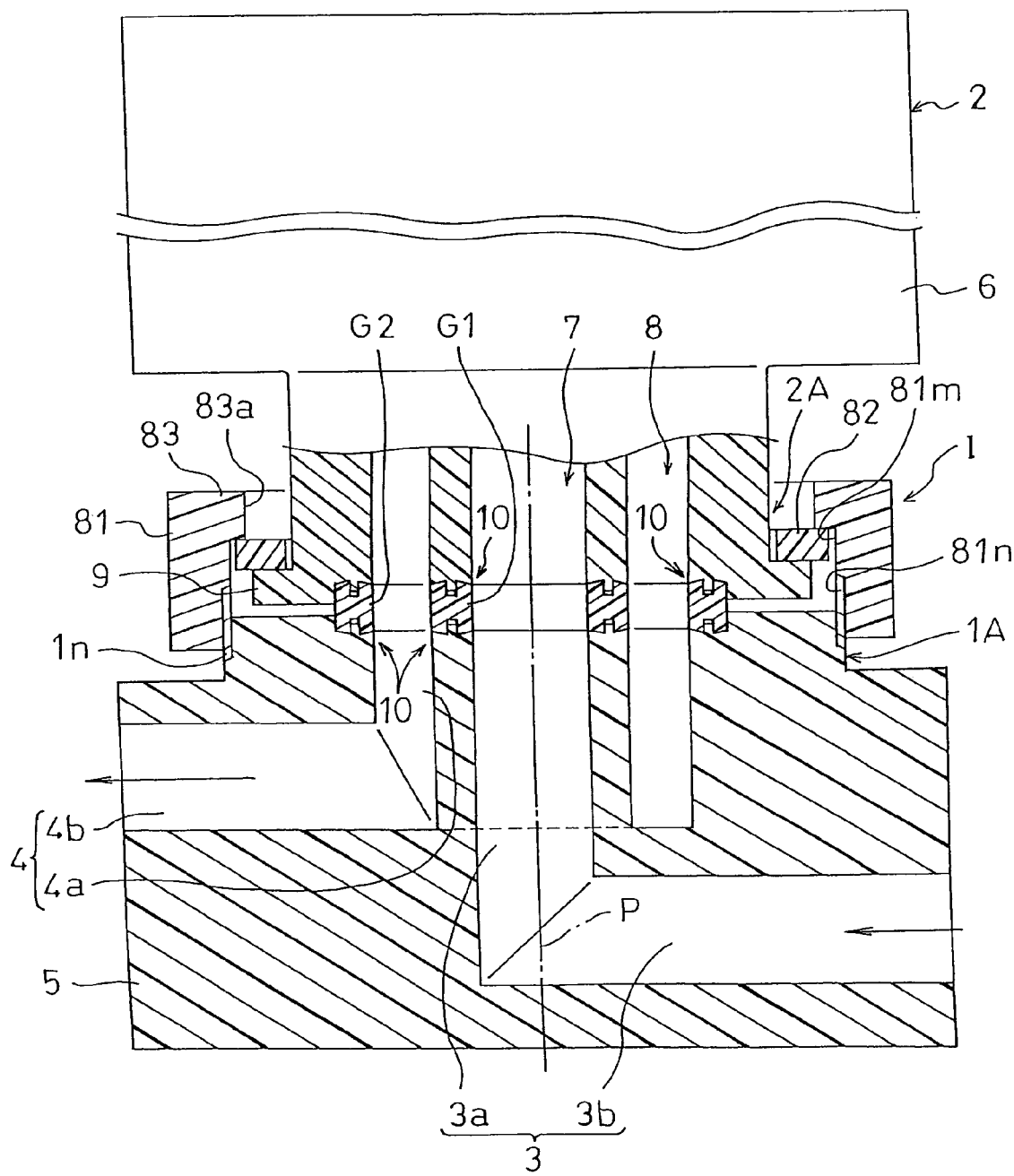
FIG. 18 is a section view (Embodiment 11) of main portions showing a sixth other structure of holding means having an attracting function.
Figure 20:
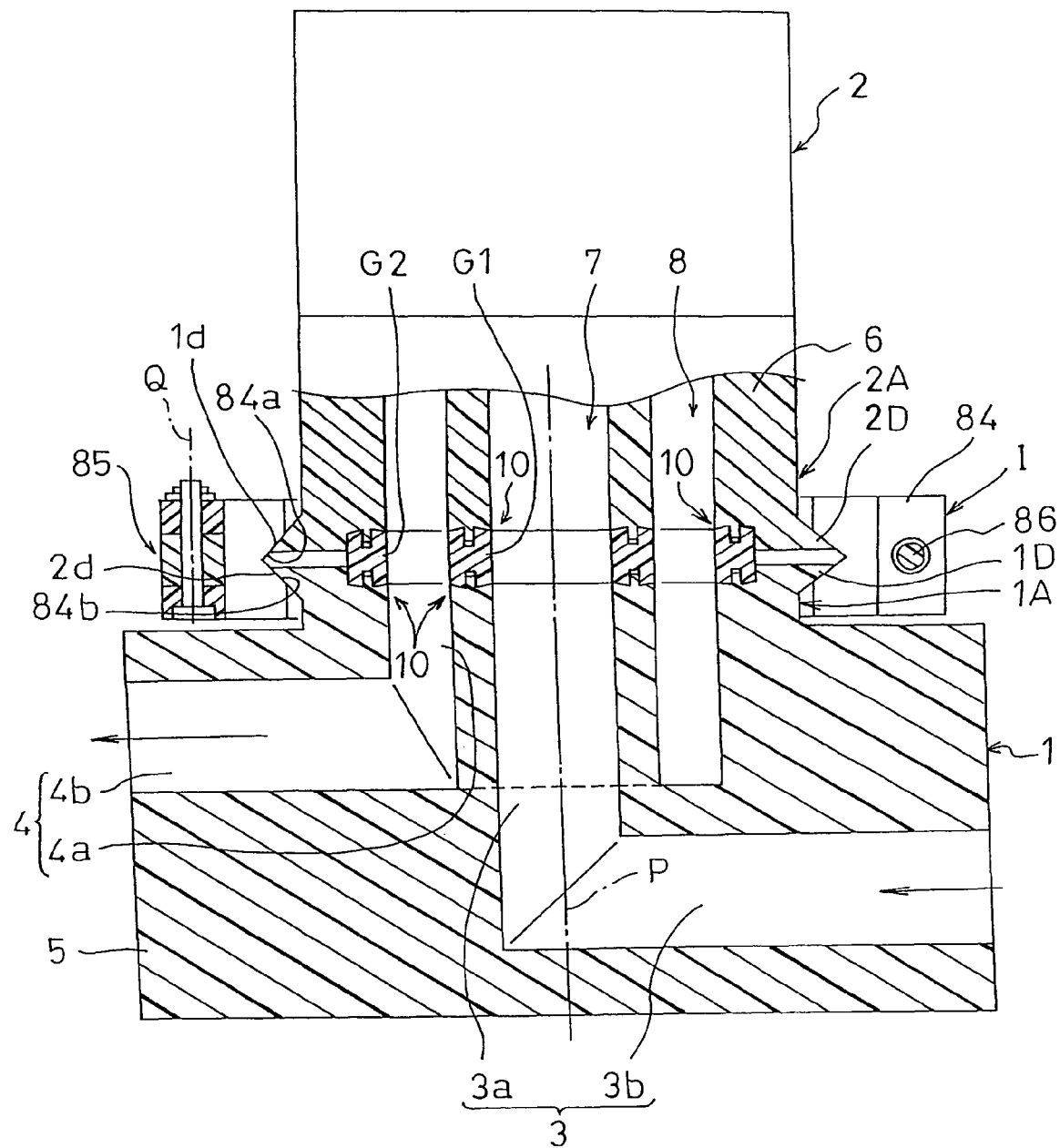
FIG. 20 is a section view (Embodiment 12) of main portions showing a seventh other structure of holding means having an attracting function.
Figure 21A:
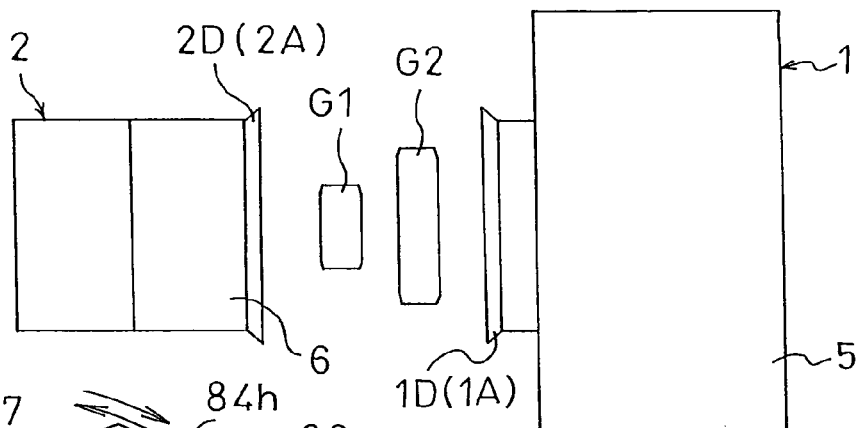
FIG. 21 is a diagram showing a connection procedure of a connecting structure having the holding means of FIG. 19.
Figure 21B:
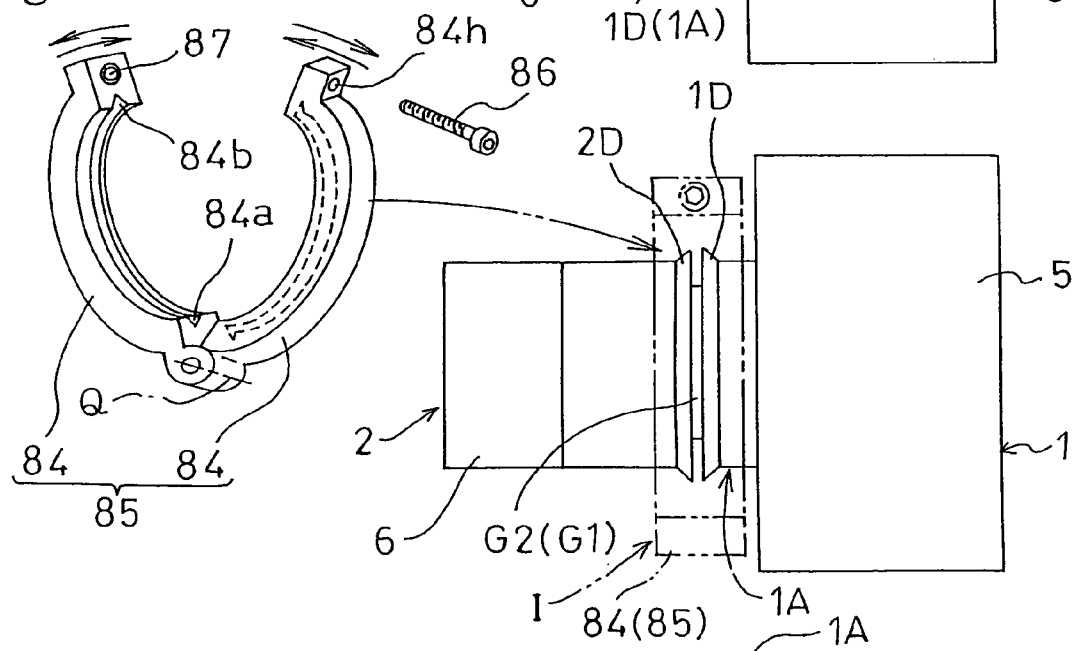
Figure 21C:
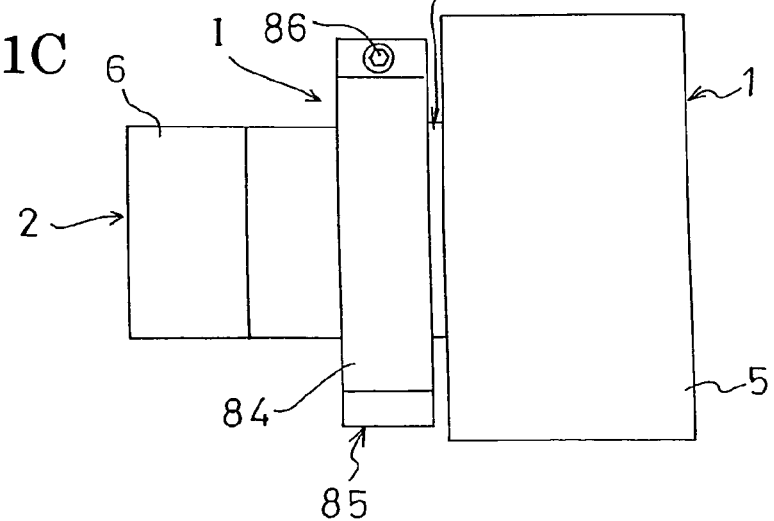
Figure 22:
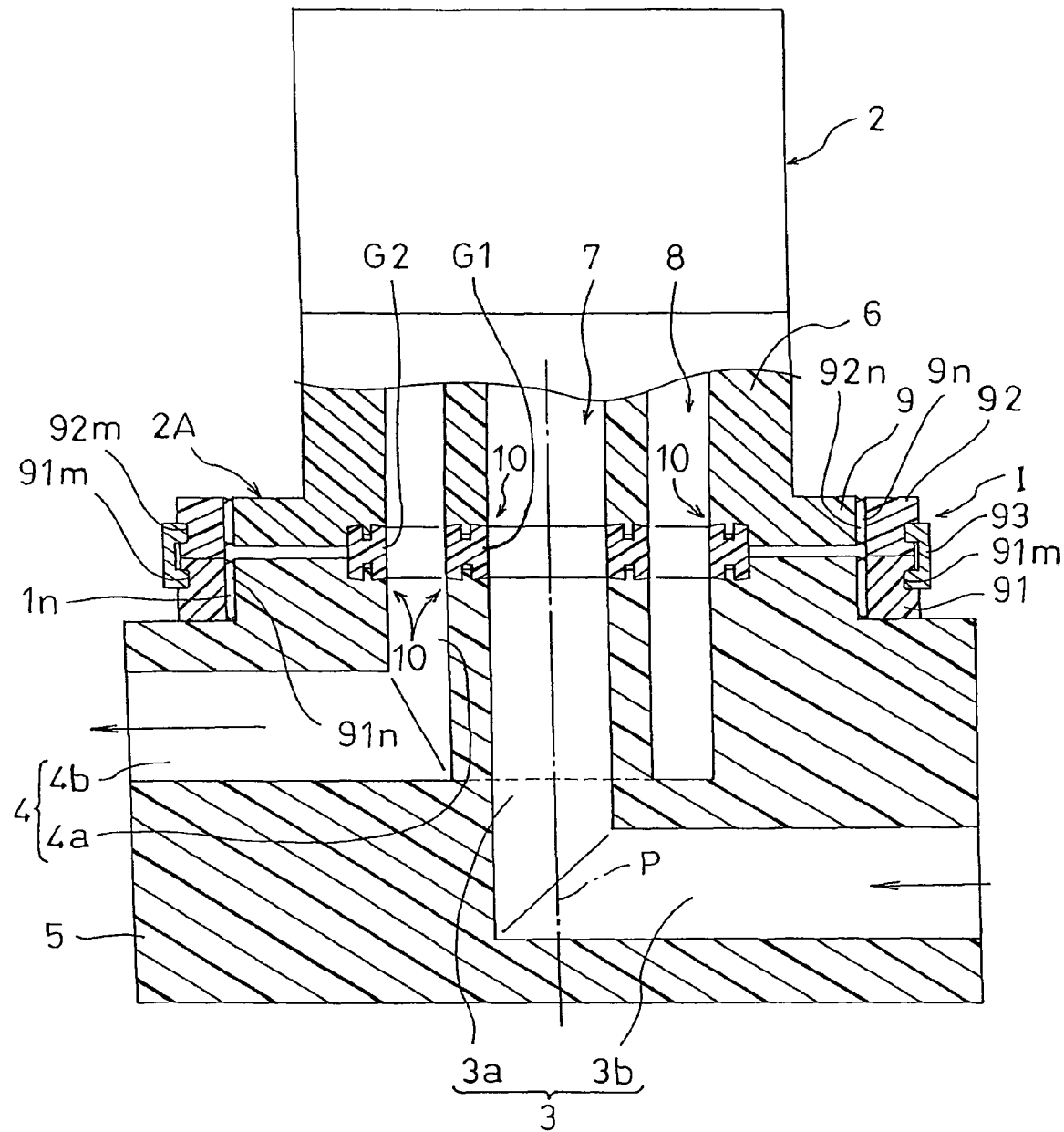
FIG. 22 is a section view (Embodiment 13) of main portions showing the structure of the holding means.

Hereinafter, embodiments of the connecting structure for an integration panel and a fluid device of the invention will be described with reference to the drawings. FIGS. 1 to 3 show a connecting structure for an integration panel and a fluid device in Embodiment 1, FIGS. 4 and 5 show connecting structures for an integration panel and a fluid device in Embodiments 2 and 3, respectively, FIGS. 6 to 12 show other structures of holding means, FIG. 6 shows a first other structure, FIGS. 7 and 8 show a second other structure, FIGS. 9 and 10 show a third other structure, FIG. 11 shows a fourth other structure, FIG. 12 shows a fifth other structure, and FIG. 13 shows another structure of an annular projection. FIGS. 14 and 15 are overall and main section views showing a connecting structure for an integration panel and a fluid device in Embodiment 9, FIG. 16 is an enlarged section view of main portions showing in detail a fitting structure for a first gasket and a first fluid supply/discharge port, FIG. 17 is an overall view showing a connecting structure for an integration panel and a fluid device in Embodiment 10, FIGS. 18 and 19 are half-section and assembly views of the holding means of the sixth other structure, FIGS. 20 and 21 are half-section and assembly views of the holding means of the seventh other structure, FIG. 22 is a section view of the holding means of the eighth other structure, and FIG. 23 shows another structure of an annular projection.

Embodiment 1

FIGS. 1 and 2 show a connecting structure for an integration panel and a fluid device according to Embodiment 1. The connecting structure for an integration panel and a fluid device is of the single-flow path type that extends over the integration panel 1 in which a pair of circular pipe-like fluid passages 3, 4 are formed, and a valve (such as an on-off valve or a stop valve) 2 which is mounted on the upper face 1a of the panel via ring-like gaskets G, and that shares the vertical axis P. Namely, a pair of connecting structures for supply and discharge are configured so as to be identical to each other.

In the integration panel 1, as shown in FIGS. 1 and 2, the pair of circular pipe-like supply-side fluid passages 3, 4 consisting of: vertical passages 3a, 4a which are vertically formed, and which are opened in the panel upper face 1a; and lateral passages 3b, 4b which laterally extend are formed in the panel member (or a block member) 5 made of a fluororesin such as PFA or PTFE. The portion where the supply/discharge fluid passages 3, 4 in the integration panel 1 are opened is referred to as a first fluid supply/discharge port portion 1A. In the first fluid supply/discharge port portion 1A, the circular pipe-like vertical passages 3a, 4a are formed as passages each having the axis P. In the first fluid supply/discharge port portion 1A, a lower first seal end portion t21 and lower second seal end portion t22 which have inner and outer annular projections 21 that are annular and centered at the axis P, and that are upward projected are formed in the outer diameter-side portions of the fluid passages 3, 4 which are opened in the upper end face of the port portion, respectively.

As shown in FIGS. 1 and 2, the valve (an example of the fluid device) 2 has a valve case 6 which is made of a fluororesin such as PFA or PTFE, and which is circular in a vertical view. A lower end portion of the valve case 6 is formed as a second fluid supply/discharge port portion 2A having: a circular pipe-like supply-side fluid passage 7 which is vertically placed in a state where it is down-ward projected from the lower face 6a; and a circular pipe-like discharge-side fluid passage 8 which is vertically placed in a state where it is opened on a lateral side of the supply-side fluid passage 7 and laterally separated therefrom. In the second fluid supply/discharge port portion 2A, namely, each of the circular pipe-like supply/discharge fluid passages 7, 8 is formed as a passage having the axis P. A pair of mounting flanges 9 which have a pair of bolt insertion holes 9a, and which are made of a fluororesin such as PFA, PTFE, or another material are downward projectedly formed on the lower end of the valve case 6. Each of the mounting flanges 9 is formed by a pipe portion 9A having fluid passages 7, 8, and a flange portion (outward flange) 9B. The supply-side mounting flange 9 is formed into an upper first seal end portion t11 having an annular projection 11 which is down-ward projected, and the discharge-side mounting flange is formed into an upper second seal end portion t12 having an annular projection 11 which is upward projected.

The pair of gaskets G are identical to each other. Their structures will be described while taking the supply-side gasket G as an example. The gasket G is configured as a portion made of a fluororesin such as PFA or PTFE, and having: a pipe-like fluid path W which is formed so as to allow the vertical passage 3a and supply-side fluid passage 7 that are corresponding fluid passages of the supply-side upper and lower fluid supply/discharge port portions 1A, 2A, to communicate with each other; and a pair of upper and lower annular grooves 51, 51 which are formed in an outer diameter-side portion of the fluid path W so as to be fitted with the annular projections 11, 21 of the upper first seal end portion t11 and upper second seal end portion t12 that are formed on the end faces of the first and second fluid supply/discharge port portions 1A, 2A.

Namely, the section shape of the gasket G is formed into a substantially H-like shape which has the pair of upper and lower annular grooves 51, 51, and inner and outer peripheral walls 54, 55 for forming the annular grooves 51, 51, in which the upper and lower annular grooves 51, 51 have the same depth and width, and are vertically symmetric, and the inner and outer peripheral walls 54, 55 are laterally symmetric, and which is axisymmetric (or approximately axisymmetric) about both the vertical center line Z along the direction of the axis P of the first and second fluid supply/discharge port portions 1A, 2A, and the lateral center line X perpendicular to the vertical center line Z. Upper and lower end portions of the inner peripheral wall 54 are formed as tapered inner peripheral faces 52a, 52a in which upper and lower end portions of the fluid path W serving as the inner peripheral face 54a are outward inclined in a funnel-like manner.

Also upper and lower end portions of the outer peripheral wall 55 are formed as tapered outer peripheral faces 53a, 53a in which upper and lower end portions of the outer peripheral face 55a are inward inclined.

On the inner- and outer-diameter sides of the annular projection 21 of the lower first seal end portion t21 of the first fluid supply/discharge port portion 1A of the integration panel 1, and the annular projection 11 of the upper first seal end portion t11 of the second fluid supply/discharge port portion 2A of the valve 2, annular press projections (an example of the annular press portion) 12, 13, 22, 23 are formed to prevent inner and outer peripheral wall end portions 52a, 53a which are projected in the direction of the axis P in order to form the annular groove 51 in the gasket G, from being expandingly deformed by fittings between the annular groove 51 and the annular projections 11, 21.

The structure relating to the annular press projections will be described about the gasket G and the upper first seal end portion t11. The inner and outer annular press projections 12, 13 are symmetric, and formed as annular projections that have a forward-narrowed shape, and that have a tapered outer peripheral face 12a and a tapered inner peripheral face 13a in which side peripheral faces on the side of the annular projections are inclined so that valley portions 14, 15 surrounded by the projections and the annular projection 11 have an inward-narrowed shape (upward narrowed shape). Namely, the upper first seal end portion t11 is a generic term of the annular projection 11, and the annular press projections 12, 13 and valley portions 14, 15 which are formed on the both of inner and outer sides of the annular projection.

Upper end portions of the inner and outer peripheral walls 54, 55 of the gasket G have annular seal projections (an example of the peripheral wall end portions) 52, 53 which are forward-narrowed, which have tapered inner and tapered outer peripheral faces 52a, 53a butting against the tapered outer and tapered inner peripheral faces 12a, 13a of the annular press projections 12, 13, respectively, and which are fittable into the valley portions 14, 15. In a joined state (see FIG. 1), the annular seal projections 52, 53 which are upper end portions of the inner and outer peripheral walls 54, 55 enter into the corresponding valley portions 14, 15, the tapered outer peripheral face 12a of the upper first seal end portion t11 is pressingly contacted with the tapered inner peripheral face 52a of the gasket G, and the tapered inner peripheral face 13a of the upper first seal end portion t11 is pressingly contacted with the tapered outer peripheral face 53a of the gasket G.

Namely, an upper sealing portion g11 is formed by the annular groove 51 and the annular seal projections 52, 53 inside and outside thereof, in the upper end portion of the gasket G, and similarly a lower sealing portion g12 is formed in the lower end portion. The upper sealing portion g11 is fitted to the upper first seal end portion t11 to form a fitting sealing portion 10, and the lower sealing portion g12 is fitted to the lower second seal end portion t21 to form a fitting sealing portion 10.

The fitting structure of the fitting sealing portions 10 will be described in detail about the upper first seal end portion t11 and the upper sealing portion g11 of the gasket G. As shown in FIGS. 2 and 3, the inner and outer valley portions 14, 15 are symmetric, and the inner and outer annular seal projections 52, 53 are symmetric. The contained angle $\alpha°$ of the whole of the inner and outer valley portions 14, 15, and the opposed angle $\beta°$ of the whole of the inner and outer annular seal projections 52, 53 are set to have the relationship of $\alpha°<\beta°$. Preferably, the angles are set to have the relationship of $\alpha°+$ (20 to 40°)=$\beta°$. According to the configuration, in the joined state (described later) in which the upper annular projection 11 of the upper first seal end portion t11 is fitted to the annular groove 51, the tapered outer peripheral face 12a of the upper inner annular press projection 12, and the tapered inner peripheral face 52a of the upper inner annular seal projection 52 are in a state where they are pressingly contacted with each other in the innermost diameter portion (see the phantom line in FIG. 3), thereby attaining an advantage that they function as a primary sealing portion (an example of the sealing portion) S1 which prevents the fluid passing through the fluid passage W from entering between the tapered outer and tapered inner peripheral faces 12a, 52a.

Between the width d1 of the upper annular projection 11 and the width d2 of the upper annular groove 51, a relationship of d1>d2 is established. Preferably, the widths are set to have the relationship of d1×(0.6 to 0.8)=d2. Between the projection length h1 of the upper annular projection 11 and the depth h2 of the upper annular groove 51, a relationship of h1<h2 is established. According to the configuration, the upper annular projection 11 and the upper annular groove 51, more specifically, the both inner and outer side peripheral faces of the upper annular projection 11, and the corresponding inner and outer side peripheral faces of the upper annular groove 51 are strongly pressingly contacted with each other to form a secondary sealing portion S2 which exhibits an excellent sealing performance of preventing the fluid from leaking. Moreover, the tapered outer peripheral face 12a of the upper inner annular press projection 12 surely butts against the tapered inner peripheral face 52a of the upper inner annular seal projection 52. Accordingly, there is an advantage that the above-mentioned primary sealing portion S1 is satisfactorily formed.

As shown in FIG. 3, the fitting sealing portion 10 may be set in the following manner. The relationship between the height h3 of the annular press projections 12, 22 (13, 23) along the direction of the axis P, and the projection length h1 of the annular projection 11 (21) may be set to be h1=h3 or h1<h3 in place of the relationship of h1>h3 shown in FIG. 3. In order to enable the secondary sealing portion S2 on the inner-diameter side to surely function, R1<R2 may be preferably established where R1 and R2 are the radii of the annular projection 11 (21) and the annular groove 51 with respect to the axis P, respectively. Alternatively, a structure may be possible in which the peripheral wall end portion 52 on the inner-diameter side is press contacted with the annular projection 11 (21), but the secondary sealing portion S2 is not formed.

The tip ends of the inner annular press projection 12 and the annular seal projections 52, 53 are formed into a shape which is cut so as not to form a pin angle, i.e., into an inclined cut face 12b and cut faces 52b, 53b. According to the configuration, even when the tip end of the upper inner annular press projection 12 is slightly expandingly deformed toward the fluid passage W, only a recess having a triangular section shape which is largely opened is formed in the middle of the fluid passage W because they have originally such a cut shape. The fluid existing in the recess easily flows out, and liquid stagnation is substantially prevented from being produced. Moreover, the opening angle of the recess, i.e., the contained angle between the inclined cut face 12b and the tapered inner peripheral face 52a is sufficiently large, and hence the possibility that liquid stagnation due to surface tension is caused is eliminated. Inner and outer peripheral edge portions of the tip end of the annular projection 11 are formed as a chamfered shape portion 11a which is chamfered. Therefore, the press movement into the narrow annular groove 51 can be smoothly performed without causing any problem such as scuffing.

Figure 13A:
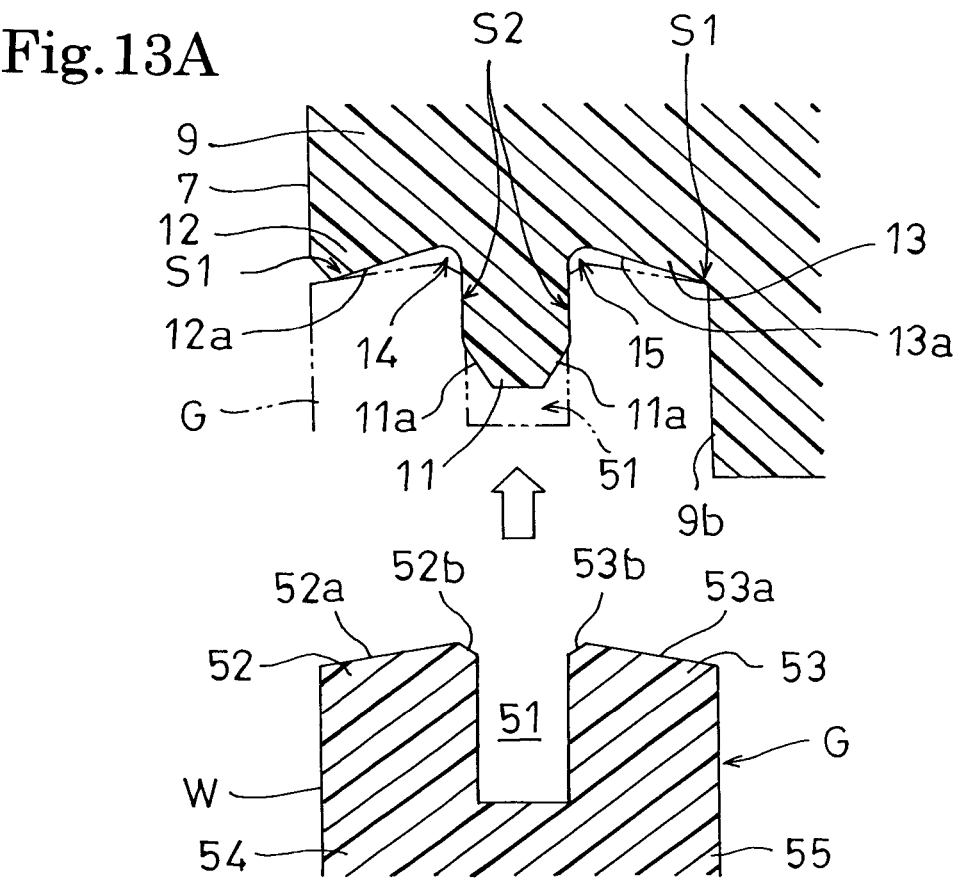
FIGS. 13(a) and 13(b) are section views of main portions showing another shape of an annular projection.

As shown in FIG. 13(a), the annular projection 11 may be formed into a tapered section shape in which the chamfered shape portions 11a of the inner and outer peripheral edge portions of the tip end of the annular projection are clearly enlarged, thereby facilitating the insertion of the annular projection 11 into the annular groove 51. According to the configuration, even when the relative position between the first or second fluid supply/discharge port portion 1A or 2A and the gasket G during assembly is slightly deviated from a desired adequate state, the annular projection 11 is surely guided into the annular groove 51 while the inner or outer chamfered shape portion 11a which has a tapered shape functions as a fitting guide. In this case, the fitting sealing portion 10 (the secondary sealing portion S2) is formed by fitting portions between the root portion of the annular projection 11 and tip end portion of the annular groove 51.

Figure 13B:
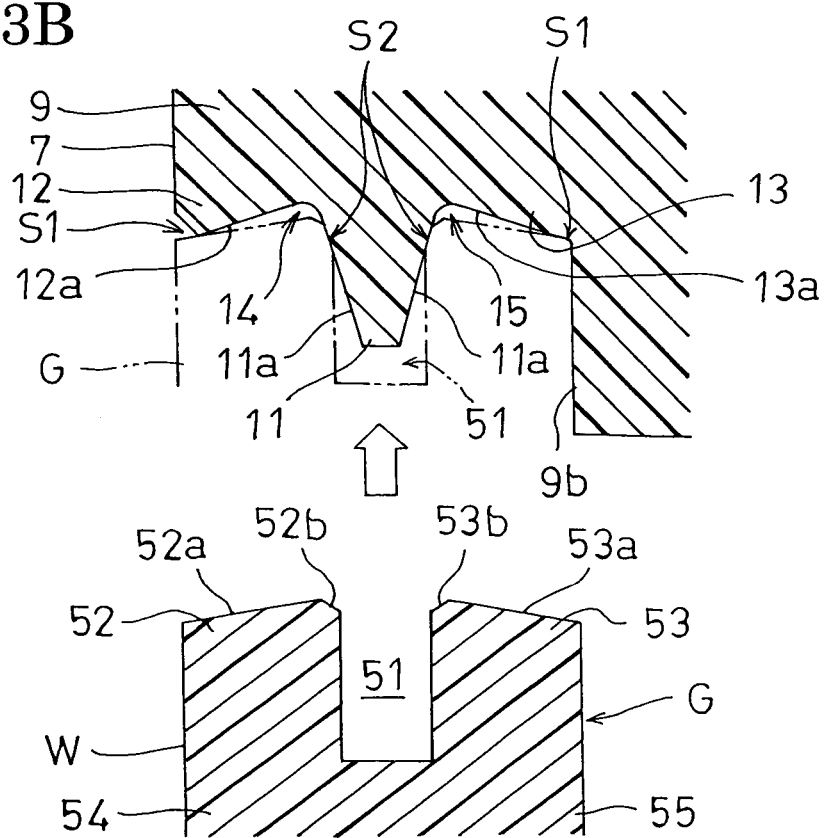

As shown in FIG. 13(b), the chamfered shape portions 11a may be further enlarged, and an extremely tapered shape may be formed so that the whole of the inner and outer side peripheral faces of the annular projection 11 is configured as the inclined tapered peripheral faces 11a.

In this case, the fitting guiding function is enhanced, and the insertion of the annular projection 11 into the annular groove 51 is further facilitated, and the disposition of the fitting sealing portion 10 (the secondary sealing portion S2) produces a wedge effect that the annular projection 11 widens the annular groove 51, so that the tip end portion of the annular groove 51 and the root portion of the annular projection 11 are circumferentially press contacted with each other by line contact or a very small area, whereby the sealing function can be exerted more surely. The structures shown in FIGS. 13(a) and 13(b) may be applied to the other annular projection 21.

In the outer annular press projection 13, a lower-end inner peripheral portion 9b for forming a lower end portion of the valve case 6 exists in a state where it is continuous to a tapered inner peripheral face 13a of the annular press projection 13. The whole shape of the projection is different from that of the inner annular press projection 12. In the lower first seal end portion t21, an upper-end inner peripheral portion 5b for forming an upper end portion of the panel member 5 exists in a state where it is continuous to the tapered inner peripheral face 23a of the annular press projection 23, and also the whole shape is different from the inner annular press projection 22. The upper- and lower-end inner peripheral portions 5b, 9b serve as a guide in the case where the upper and lower sealing portions g11, g12 of the gasket G are fitted to the upper and lower first seal end portions t11, t21, and can perform a function of cooperating with the tapered inner peripheral faces 13a, 23a to prevent an outer peripheral wall 55 of the gasket G from being expandingly deformed.

As indicated by the phantom lines in FIG. 6, a ring-like flange 1f for attachment and detachment which is laterally projected may be integrally formed on the outer peripheral wall 55 of the gasket G. In this configuration, there is an advantage that, when the gasket G is to be pulled out from the first or second fluid supply/discharge port portion 1A, 2A, the pulling operation can be easily performed by, for example, pulling the flange 1f by a tool or the fingers. In this case, the thickness of the attachable and detachable flange 1f is smaller than the distance between the first and second fluid supply/discharge port portions 1A, 2A in the joined state.

The fitting sealing portion 10 will be described in further detail. As shown in FIGS. 2 and 3, the opening angle (the opening angle between the valley portions 14, 15) D of the tapered peripheral faces 12a, 13a of the annular press projections 12, 13 is set to a value in the range of 50 to 70 deg. (50°≦D°≦70°), and the apical angle E of the tapered peripheral faces 52a, 53a of the annular seal projections (peripheral wall end portions) 52, 53 is set to a value in the range of 60 to 80 deg. (60°≦D°≦80°). The opening angle D and the apical angle E are set so that the apical angle E is a sum of the opening angle D and an angle of 10 to 20 deg. [D°+(10 to 20°)=E°].

More preferably, the opening angle D is set to 69 to 71 deg. (D°=70±1°), the apical angle E is set to 79 to 81 deg. (E°=80±1°), and the apical angle E is set to the opening angle D+9 to 11 deg. (E°−D°=10±1°).

The cut angle Ds of the inclined cut face 12b of the annular press projection 12 is set to 49 to 51 deg. (Ds°=50°±1°), and the attack angle Es of the tip-end cut faces 52b, 53b of the peripheral wall end portions 52, 53 is set to 124 to 126 deg. (Es°=125°±1°). According to the setting of the angles, the tapered outer peripheral face 12a and the tapered inner peripheral face 52a butts against each other in an annular line-contact state, whereby the seal-lip effect is exerted in the primary sealing portion S1. Also between the tapered inner peripheral face 13a and the tapered outer peripheral face 53a, the sealing function is exerted in their outer-diameter side end portion. Although not illustrated, in the case where the lower-end inner peripheral portion 9b does not exist (in the case where the fitting portions in an integration panel or a fluid device with respect to the gasket G has a laterally symmetric section shape), an inclined cut face similar to the inclined cut face 12b is formed on the outer annular press projection 13, and the seal-lip effect is produced.

Namely, the apical angle E of the tapered peripheral faces 52a, 53a (the tapered inner peripheral face 52a, the tapered outer peripheral face 53a) of the annular seal projections (peripheral wall end portions) 52, 53 with respect to the attracting direction along which the first fluid supply/discharge port portion 1A and the second fluid supply/discharge port portion 2A are attracted to each other is set to a value which is a sum of the opening angle D of the tapered peripheral faces 12a, 13a (the tapered outer peripheral face 12a, the tapered inner peripheral face 13a) on the side of the annular projection 11 in the annular press projections 12, 13 with respect to the attracting direction, and an angle of 10 to 20 deg., preferably, 10 deg. or about 10 deg. The apical angle E is set to 60 to 80 deg., preferably, 80 deg. or about 80 deg.

In the configuration where the apical angle E and the opening angle D are set to values in the vicinity of 90 deg. and similar to an obtuse angle, the projection amounts of the annular press projections 12, 13 in the attracting direction (axial direction) are smaller than the radial width, and the strengths and rigidities of the projections are relatively improved. Accordingly, there is an advantage that, while restricting the expansions of the annular seal projections 52, 53, the possibility that they (the annular seal projections 12, 13) themselves are radially expandingly deformed can be effectively suppressed.

The component force by which the tapered peripheral faces 52a, 53a radially press the annular press projections 12, 13 in an expanding manner can be reduced by the bitings of the annular seal projections 52, 53 into the valley portions 14, 15. Also by this phenomenon, the radially expanding deformations of the annular press projections 12, 13 can be suppressed.

Next, the holding means I will be described. As shown in FIGS. 2 and 3, the holding means I is configured so that the first fluid supply/discharge port portion 1A of the integration panel 1 and the second fluid supply/discharge port portion 2A of the valve 2 are attracted to each other via the gasket G, and the attracting function holds the joined state in which the upper first seal end portion t11 of the first fluid supply/discharge port portion 1A and the upper sealing portion g11 of the gasket G, and the lower first seal end portion t21 of the second supply/discharge port portion 2A and the lower sealing portion g12 of the gasket G are fitted to each other to form the fitting sealing portions 10. Namely, the annular projection 11 of the second fluid supply/discharge port portion 2A is fitted into the upper annular groove 51 of the gasket G, and the annular projection 21 of the first fluid supply/discharge port portion 1A is fitted into the lower annular groove 51 of the gasket G.

The specific structure of the holding means I is configured by: a pair of bolts 66 which are passed through bolt passage holes 9a of the flange 9B of the second fluid supply/discharge port portion 2A; and nut portions 67, 67 which are formed correspondingly with the pair of bolt passage holes 9a, 9a in the first fluid supply/discharge port portion 1A (the panel member 5). The holding means I is provided with an attracting function that, by a fastening operation of screwing the bolts 66 with the nut portions 67, the valve 2 can be attracted to the integration panel 1, and the attracted state can be held. In the case where the press contact forces of the fitting sealing portions 10 are reduced because of aging, occurrence of creep, or the like, the reduction can be coped with by further fastening the bolts 66, and therefore the excellent sealing property can be held.

Embodiment 2

FIG. 4 shows a connecting structure for an integration panel and a fluid device according to Embodiment 2. This is a structure for connecting and coupling a filter 2 which is an example of a fluid device, with the integration panel 1. The connecting structure itself is identical with that of Embodiment 1 shown in FIGS. 1 to 3. Therefore, identical components are denoted by the same reference numerals, and the detailed description of the components is omitted.

The filter 2 is configured by a main body case 2K, a lower case 2B, and a filter element 2C. In the lower case 2B, a supply-side fluid passage 7, a discharge-side fluid passage 8, and a pair of mounting flanges 9, 9 which are laterally projected in a state where it has the fluid passages 7, 8 are formed. The mounting flanges 9, 9, and the integration panel 1 are connected and coupled to each other via the gasket G.

Embodiment 3

As shown in FIG. 5, a connecting structure for an integration panel and a fluid device according to Embodiment 3 is a connecting structure for the integration panel 1 and a regulator 2 which is an example of the fluid device. The regulator 2 has a casing 2C consisting of an upper case, an intermediate case, and a lower case, and is configured by: a bellows (not shown) in which an outer peripheral portion is clamped between the upper case and the intermediate case; a valve element (not shown) in which an outer peripheral portion is clamped between the intermediate case and the lower case; a return spring (not shown) which is housed in the lower case; and the like.

The casing 2C is integrally equipped with the pair of mounting flanges 9, 9 which are laterally projected. The regulator 2 is connected and coupled via the gasket G to the upper face 1a of the integration panel 1 by using the mounting flanges 9, 9. The connecting structure for connecting the mounting flanges 9 and the upper face 1a of the integration panel 1 via the gasket G is identical with that of Embodiment 1 shown in FIGS. 1 to 3, and the detailed description of the structure is omitted.

Embodiment 4

FIGS. 6 and 7 show a connecting structure for an integration panel and a fluid device according to Embodiment 4. The connecting structure is different only in the holding means I from that of Embodiment 1. The holding means I of a first other structure will be described. In FIGS. 6 and 7, portions corresponding to those of Embodiment 1 shown in FIGS. 1 to 3 are denoted by corresponding reference numerals. As shown in FIGS. 6 and 7, the holding means I of the first other structure is configured by: a cylindrical nut 81 having an internal thread portion 81n which is screwable with an external thread portion in formed on an outer peripheral portion of the projection-like first fluid supply/discharge port portion 1A that is formed on the upper face of the integration panel 1, and that is circular in a plan view; and a split ring 82 which has two or three or more split pieces, and which interferes in the direction of the axis P of the annular fluid passage 7 with the outward flange 9 that is formed in a lower end portion of the valve case 6 of the valve 2. The holding means I is configured as holding means having the attracting function in which, by a fastening operation of the cylindrical nut 81 in which the internal thread portion 81n is screwed with the external thread portion 1n of the first fluid supply/discharge port portion 1A, the fluid supply/discharge port portions 1A, 2A can be attracted in the direction along which they approach each other via the gasket G, and the attracted state can be held.

An opening portion 83a of an inward flange 83 which is formed on the side of the valve 2 (the upper side) of the cylindrical nut 81 is set to have a minimum internal diameter which is sufficient for allowing the passage of the outward flange 9. The outer diameter of the split ring 82 is set to be slightly smaller than the inner diameter of the internal thread portion 81n so that the split ring can freely enter into the cylindrical nut 81, and the inner diameter is set to a minimum dimension by which the split ring is fittable onto the outer diameter portion of the circular second fluid supply/discharge port portion 2A of the valve 2. In this case, in order to mount the split ring 82, the axial length of a small-diameter portion of the second fluid supply/discharge port portion 2A excluding the outward flange 9 must be larger than the sum of the axial length of the cylindrical nut 81 and the thickness of the split ring 82. Specifically, the conditions that, as shown in FIG. 7(b), the distance d3 between the cylindrical nut 81 in a state where it butts against a root portion 6t of the valve case 6, and the outward flange 9 is larger than the thickness d4 of the split ring 82 (d3>d4) is imposed.

Between an inner end portion of the internal thread portion 81n of the cylindrical nut 81 and the inward flange 83, an inner peripheral face portion 81m which is axially slidable on the split ring 82, and which has a length in the direction of the axis P that covers the width dimension of the split ring 82 is formed into a flat inner peripheral face which is coaxial with the axis P. Namely, the inner diameter portion 81a between the internal thread portion 81n of the cylindrical nut 81 and the inward flange 83 is formed into a flat inner peripheral face which is concentric with the supply-side fluid passage 7, and the dimensions are set to a fitting tolerance state where the inner diameter of the inner peripheral face portion 81m is very slightly larger than the outer diameter of the split ring 82 which is formed so as to have a rectangular section shape. By contrast, an outer diameter portion of the second fluid supply/discharge port portion 2A is formed into a flat outer peripheral face which is concentric with the supply-side fluid passage 7, and has a diameter which is substantially equal to the inner diameter of the split ring 82. According to the configuration, it is possible to eliminate disadvantages that, when the cylindrical nut 81 is screwingly advanced, the split ring 82 is inclined to gouge, and that the pressing force in the direction of the axis P due to the screw advancement of the cylindrical nut 81 is not well transmitted to the outward flange 9. Therefore, the outward flange 9 can be effectively pressed, and the first and second fluid supply/discharge port portions 1A, 2A can be satisfactorily attracted in the direction along which they approach each other.

The fluid supply/discharge port portions 1A, 2A are connected and coupled to each other by the holding means I of the first other structure in the following operation procedure. First, as shown in FIG. 7(a), the cylindrical nut 81 is passed over the outward flange 9 to be fitted onto the outer periphery of the second fluid supply/discharge port portion 2A of the valve 2, and is moved to the innermost portion (until it butts against the root portion 6t). Then, as shown in FIG. 7(b), the split ring 82 is passed between the outward flange 9 and the tip end of the cylindrical nut 81, to be fitted onto the second fluid supply/discharge port portion 2A. At or prior to this, the gasket G may be attached to the end face of one of the fluid supply/discharge port portions 1A, 2A via provisional fittings between the annular projections 11, 21, 31, 41 and the annular grooves 51, 61. Next, the first fluid supply/discharge port portion 1A is placed on the second fluid supply/discharge port portion 2A via the gasket G, the cylindrical nut 81 is slidingly moved under this state, and a fastening operation [see FIG. 7(c)] is then conducted, whereby the connection state shown in FIG. 6 is obtained. In FIG. 7, for the sake of convenience in drawing, the integration panel 1 and valve 2 which are vertically stacked to each other are shown in a laterally arranged manner.

Embodiment 5

FIGS. 8 and 9 show a connecting structure for an integration panel and a fluid device according to Embodiment 5. The connecting structure is different only in the holding means I from that of Embodiment 1. The holding means I of a second other structure will be described. In FIGS. 8 and 9, portions corresponding to those of Embodiment 1 shown in FIGS. 1 to 3 are denoted by corresponding reference numerals. The holding means I of the second other structure comprises: first and second truncated conical end portions 1D, 2D in which the diameters of the first and second fluid supply/discharge port portions 1A, 2A are increased as further advancing toward the respective end faces; a sprit press ring 85 consisting of a pair of half-arcuate members 84, 84 having an inner peripheral face having a substantially L-like section shape formed by a first tapered inner peripheral face 84a butting against a tapered outer peripheral face 1d of the first truncated conical end portion 1D, and a second tapered inner peripheral face 84b butting against a tapered outer peripheral face 2d of the second truncated conical end portion 2D; a bolt 86 for attracting the half-arcuate members 84, 84; and a nut 87 which is formed in one of the half-arcuate members 84.

In a state where the pair of half-arcuate members 84 stride over and cover the first truncated conical end portion 1D and the second truncated conical end portion 2D in the joined state, the fluid supply/discharge port portions 1A, 2A are attracted together by a force exerted by butting of the tapered faces caused by fastening the bolt 86 passed through a through hole 84h of the other half-arcuate member 84, and the nut 87 to attract together the half-arcuate members 84, 84 in which one end is hingedly pivoted at a fulcrum Q. The sprit press ring 85 is preferably formed by a fluororesin material. Alternatively, the ring may be made of another material such as an aluminum alloy.

The fluid supply/discharge port portions 1A, 2A are connected and coupled to each other by the holding means I of the second other structure in the following operation procedure. As shown in FIG. 9(a), a preliminary coupling operation of lightly connecting and coupling the first and second fluid supply/discharge port portions 1A, 2A with each other via the gaskets G is performed. Next, as shown in FIG. 9(b), the sprit press ring 85 is put on the first and second truncated conical end portions 1D, 2D on which the preliminary coupling operation has been applied, and an operation of fastening the bolt 86 is performed. As a result of the fastening of the bolt 86, the gaskets G are deeply fitted into the fluid supply/discharge port portions 1A, 2A, and, as shown in FIG. 9(c), a connected and coupled state of the integration panel 1 and the valve 2 is obtained.

Embodiment 6

FIG. 10 shows a connecting structure for an integration panel and a fluid device according to Embodiment 6. The connecting structure is different only in the holding means I from that of Embodiment 1. The holding means I of a third other structure will be described. In FIG. 10, portions corresponding to those of Embodiment 1 shown in FIGS. 1 to 3 are denoted by corresponding reference numerals. The holding means I of the third other structure comprises: the projection-like first fluid supply/discharge port portion 1A which is formed on the upper face of the integration panel 1 in a state where the external thread portion in is formed in the outer peripheral portion, and which is circular in a plan view; the flange portion 9 which is formed on a lower end portion of the valve case 6 in a state where an external thread portion 9n is formed in the outer peripheral portion of the second fluid supply/discharge port portion 2A; first and second ring nuts 91, 92 having internal thread portions 91n, 92n which are screwable with the external thread portions 1n, 9n; and an engagement ring 93 which is fittable into outer peripheral grooves 91m, 92m of the ring nuts 91, 92, and which has a substantially U-like section shape.

The ring nuts 91, 92 and the engagement ring 93 are made of a fluororesin such as PFA or PTFE, and which has a certain degree of flexibility. The fluid supply/discharge port portions 1A, 2A are connected and coupled to each other by the holding means I of the third other structure in the following operation procedure. The engagement ring 93 is previously engaged with the ring nuts 91, 92, whereby the integrated first and second ring nuts 91, 92 are previously formed. The integrated first and second ring nuts 91, 92 are screwed on the first and second fluid supply/discharge port portions 1A, 2A which are attracted together via the gaskets G to be set to the assembled state, thereby forming a connecting structure for an integration panel and a fluid device. It is a matter of course that, in this case, the external thread portions 1n, 9n must be identical to each other. After the screwing, the ring nuts 91, 92 can be turned to be fastened more strongly, or to perform further fastening.

Alternatively, the following assembling procedure may be possible. In a state where the ring nuts 91, 92 are screwed to the corresponding external thread portions 1n, 9n, an attracting step is conducted in which the first and second fluid supply/discharge port portions 1A, 2A are attracted together via the gaskets G, and the port portions are connected to each other in a sealed state where the gaskets G are pressingly contacted with each other. The attracting step is conducted by dedicated attracting means other than the holding means I. Thereafter, the engagement ring 93 is forcedly deformed by expanding the diameter, whereby the ring is fitted into the outer peripheral grooves 91m, 92m of the first and second ring nuts 91, 92 which are screwed in a state where the ring nuts are adjacent to the external thread portions 1n, 9n, respectively.

As a result, a connecting structure for an integration panel and a fluid device is formed. Namely, the engagement ring 93 is engaged by forced fitting with the ring nuts 91, 92.

The thus configured holding means 1 literally has only a function of holding the sealed connection state of the first and second fluid supply/discharge port portions 1A, 2A via the gasket G. However, the ring nuts 91, 92 and the engagement ring 93 are relatively rotatable, and therefore both of the ring nuts 91, 92 can singly rotatingly move. In the case where the seal press contact force is reduced because of aging, occurrence of creep, or the like, a further fastening operation can be performed by forcedly rotating one or both of the ring nuts 91, 92.

Embodiment 7

FIG. 11 shows a connecting structure for an integration panel and a fluid device according to Embodiment 7. The connecting structure is different only in the holding means I from that of Embodiment 1. The holding means I of a fourth other structure will be described. As shown in FIG. 11, the holding means I of the fourth other structure is configured by: the projection-like first fluid supply/discharge port portion 1A which is formed on the upper face of the integration panel 1 in a state where an outer peripheral portion has an external thread portion 1n, and which is circular in a plan view; the flange portion 9 which is formed on a lower end portion of the valve case 6 in a state where an external thread portion 9n is formed in the outer peripheral portion of the second fluid supply/discharge port portion 2A; and a cylindrical nut 101 having an internal thread portion 101n which is screwable with the external thread portions 1n, 9n.

In the cylindrical nut 101, a gouged inner peripheral portion 101a the diameter of which is larger than the external thread portions 1n, 9n is formed between the internal thread portion 101n on the tip end side and an inward flange 102 on a basal end side, and the inward flange 102 is formed so as to have an inner diameter dimension at which the inward flange 102 interferes with the flange portion 9 in the direction of the axis P. In an assembled state shown in FIG. 11, the external thread portion 9n of the fluid device 2 is housed in the gouged inner peripheral portion 101a, and only the external thread portion 1n of the integration panel 1 and the internal thread portion 101n are screwed with each other. This state holds the state where the first and second fluid supply/discharge port portions 1A, 2A are attracted together.

In assembling, first, the internal thread portion 101n of the cylindrical nut 101 is screwed and fastened with the external thread portion 9n of the flange portion 9 of the fluid device 2, and passed over the external thread portion 9n to set a state where the external thread portion is rotatably housed in the gouged inner peripheral portion 101a. In this state, the internal thread portion 101n is screwed and fastened via the gasket G with the external thread portion in of the integration panel 1. Then, the cylindrical nut 101 and the external thread portion 9n of the flange portion 9 are relatively idle. Therefore, only the integration panel 1 is advanced by fastening, with the result that the attracted state where the integration panel 1 and the fluid device 2 are attracted together, and the fluid passages 3, 7 are communicatingly connected and coupled to each other in the sealed state by the gasket G is held. The structure is configured as the holding means I having the attracting function.

Embodiment 8

FIG. 12 shows a connecting structure for an integration panel and a fluid device according to Embodiment 8. The connecting structure is different only in the holding means I from that of Embodiment 1. The holding means I of a fifth other structure will be described. The holding means I of the fifth other structure has a compromise configuration between the holding means I of the first other structure shown in FIG. 6, and the holding means I of the fourth other structure shown in FIG. 11. As shown in FIG. 12, the holding means is configured by: the projection-like first fluid supply/discharge port portion 1A which is formed on the upper face of the integration panel 1 in a state where an outer peripheral portion has an external thread portion 1n, and which is circular in a plan view; the flange portion 9 which is formed on a lower end portion of the valve case 6 in a state where an external thread portion 9n is formed in the outer peripheral portion of the second fluid supply/discharge port portion 2A; a cylindrical nut 111 having an internal thread portion 111n which is screwable with the external thread portions 1n, 9n; and a split ring 112.

In the cylindrical nut 111, a gouged inner peripheral portion 111a the diameter of which is larger than the external thread portions 1n, 9n is formed between the internal thread portion 111n on the tip end side and an inward flange 113 on a basal end side, and the inward flange 113 is formed so as to have an inner diameter portion 113a of a size at which the inward flange 113 does not interfere with the flange portion 9 in the direction of the axis P. The split ring 112 is formed by splitting a circular ring into three or more portions (for example, three sector members of a little less than 120 deg.), so as to allow operations that the split ring passes over the inward flange 113 and the internal thread portion 111n and then enters from the outside into the gouged inner peripheral portion 111a, and that the split members are assembled into a ring-like form in the gouged inner peripheral portion 111a. Alternatively, the split ring 112 may be configured by a single C-like member which is flexile to some extent so that, when it bends radially like a snap ring, it can enter into the gouged inner peripheral portion 111a.

An assembling process using the holding means I of the fifth other structure is performed in the following manner. Namely, a state in which the split ring 112 enters into the gouged inner peripheral portion 111a in the above-described manner is previously set. The subsequent steps are identical with those of the case of the holding means I of the fourth other structure described above. Therefore, further description of the assembling procedure is omitted.

Embodiment 9

FIGS. 14 and 15 show a connecting structure for an integration panel and a fluid device according to Embodiment 9. The connecting structure for an integration panel and a fluid device is a concentric double flow path structure that extends over both an integration panel 1 in which plural pipe-like fluid passages 3, 4 are formed, and a valve (such as an on-off valve or a stop valve) 2 which is mounted on the upper face 1a of the panel via inner and outer ring-like gaskets G1, G2 numbering two in total, and that shares the vertical axis P.

In the integration panel 1, as shown in FIGS. 14 and 15, the pipe-like supply-side fluid passage 3 consisting of: a vertical passage 3a which is vertically formed, and which is opened in the panel upper face 1a; and a lateral passage 3b which laterally extends, and the discharge-side fluid passage 4 consisting of: an annular vertical ring passage 4a which is formed on an outer diameter-side of the vertical passage 3a, and which is opened in the panel upper face 1a; and a lateral passage 4b which communicates with a bottom portion of the ring passage, and which laterally extends are formed in a panel member (or a block member) 5 made of a fluororesin such as PFA or PTFE. The portion where the supply/discharge fluid passages 3, 4 in the integration panel 1 are opened in a double-pipe like manner is referred to as a first fluid supply/discharge port portion 1A. In the first fluid supply/discharge port portion 1A, the pipe-like vertical passage 3a and the annular vertical ring passage 4a are formed as concentric passages having the common axis P. In the first fluid supply/discharge port portion 1A, a lower first seal end portion t21 and lower second seal end portion t22 which have inner and outer annular projections 21, 41 that are annular and centered at the axis P, and that are upward projected are formed in the outer diameter-side portions of the fluid passages 3, 4 which are opened in the upper end face of the port portion, respectively.

As shown in FIGS. 14 and 15, the valve (an example of the fluid device) 2 has a valve case 6 which is made of a fluororesin such as PFA or PTFE, and which is circular in a vertical view. A lower end portion of the valve case 6 is formed as a second fluid supply/discharge port portion 2A having: a pipe-like supply-side fluid passage 7 which is vertically placed at the center of the lower end portion in a state where it is opened in the lower face 6a; and an annular discharge-side fluid passage 8 which is formed on the outer-diameter side of the supply-side fluid passage 7, and which is vertically placed in a state where it is opened in the lower face 6a. In the second fluid supply/discharge port portion 2A, namely, the pipe-like supply-side fluid passage 7 and the annular discharge-side fluid passage 8 are formed as concentric passages having the common axis P. A mounting flange 9 which has a pair of bolt insertion holes 9a, and which is made of a fluororesin such as PFA or PTFE or another material is integrated by fusion bonding to an outer peripheral portion of the lower end of the valve case 6. Alternatively, the valve case 6 and the mounting flange 9 are formed as an integral member which is integrally formed by a cutting or molding process. In the second fluid supply/discharge port portion 2A, an upper first seal end portion t11 and upper second seal end portion t12 which have inner and outer annular projections 11, 31 that are annular and centered at the axis P, and that are upward projected are formed in the outer diameter-side portions of the fluid passages 7, 8 which are opened in the lower end face of the port portion, respectively.

The inner and outer ring-like gaskets G1, G2 are different only in diameter, and formed into the same section shape. Their structures will be described while taking the inner first gasket G1 as an example. In the outer second gasket G2 the description of which is omitted, portions corresponding to those of the first gasket G1 are denoted by corresponding reference numerals (for example, 54a→64a). The first gasket G1 is configured as a portion made of a fluororesin such as PFA or PTFE, and having: a pipe-like fluid path W1 which is formed so as to allow the vertical passage 3a and supply-side fluid passage 7 that are corresponding fluid passages of the first and second fluid supply/discharge port portions 1A, 2A, to communicate with each other; and a pair of upper and lower annular grooves 51, 51 which are formed in an outer diameter-side portion of the fluid path W1 so as to be fitted respectively with the annular projections 11, 31 of the upper first seal end portion t11 and upper second seal end portion t12 that are formed on the end faces of the first and second fluid supply/discharge port portions 1A, 2A.

Namely, the section shape of the first gasket G1 is formed into a substantially H-like shape which has the pair of upper and lower annular grooves 51, 51, and inner and outer peripheral walls 54, 55 for forming the annular grooves 51, 51, in which the upper and lower annular grooves 51, 51 have the same depth and width, and are vertically symmetric, and the inner and outer peripheral walls 54, 55 are laterally symmetric, and which is axisymmetric (or approximately axisymmetric) about both the vertical center line Z along the direction of the axis P of the first and second fluid supply/discharge port portions 1A, 2A, and the lateral center line X perpendicular to the vertical center line Z. Upper and lower end portions of the inner peripheral wall 54 are formed as tapered inner peripheral faces 52a, 52a in which upper and lower end portions of the fluid path W1 serving as the inner peripheral face 54a are outward inclined in a funnel-like manner.

Also upper and lower end portions of the outer peripheral wall 55 are formed as tapered outer peripheral faces 53a, 53a in which upper and lower end portions of the outer peripheral face 55a are inward inclined.

On the inner- and outer-diameter sides of the annular projections 21, 41 of the lower first and lower second seal end portions t21, t22 of the first fluid supply/discharge port portion 1A of the integration panel 1, and the annular projections 11, 31 of the upper first and upper second seal end portions t11, t12 of the second fluid supply/discharge port portion 2A of the valve 2, annular press projections (an example of annular press portions) 12, 13, 22, 23, 32, 33, 42, 43 are formed to pre-vent inner and outer peripheral wall end portions 52a, 53a, 62a, 63a which are projected in the direction of the axis P in order to form the annular grooves 51, 61 in the gaskets G1, G2, from being expandingly deformed by fittings between the corresponding annular grooves 51, 61 and the corresponding annular projections 11, 21, 31, 41.

The structure relating to the annular press projections will be described about the first gasket G1 and the upper first seal end portion t11. The inner and outer annular press projections 12, 13 are symmetric, and formed as annular projections that have a forward-narrowed shape, and that have a tapered outer peripheral face 12a and a tapered inner peripheral face 13a in which side peripheral faces on the side of the annular projections are inclined so that valley portions 14, 15 surrounded by the projections and the annular projection 11 have an inward-narrowed shape (upward narrowed shape). Namely, the upper first seal end portion t11 is a generic term of the annular projection 11, and the annular press projections 12, 13 and valley portions 14, 15 which are formed on the both of inner and outer sides of the annular projection.

Upper end portions of the inner and outer peripheral walls 54, 55 of the first gasket G1 have annular seal projections (an example of the peripheral wall end portions) 52, 53 which are forward-narrowed, which have tapered inner and tapered outer peripheral faces 52a, 53a butting against the tapered outer and tapered inner peripheral faces 12a, 13a of the annular press projections 12, 13, respectively, and which are fittable into 14, 15. In a joined state (see FIG. 14), the annular seal projections 52, 53 which are upper end portions of the inner and outer peripheral walls 54, 55 enter into the corresponding valley portions 14, 15, the tapered outer peripheral face 12a of the upper first seal end portion t11 is pressingly contacted with the tapered inner peripheral face 52a of the first gasket G1, and the tapered inner peripheral face 13a of the upper first seal end portion t11 is pressingly contacted with the tapered outer peripheral face 53a of the first gasket G1.

Namely, an upper sealing portion g11 is formed by the annular groove 51 and the annular seal projections 52, 53 inside and outside thereof, in the upper end portion of the first gasket G1, and similarly a lower sealing portion g12 is formed in the lower end portion. The upper sealing portion g11 is fitted to the upper first seal end portion t11 to form a fitting sealing portion 10, and the lower sealing portion g12 is fitted to the lower second seal end portion t21 to form a fitting sealing portion 10. Also in the second gasket, similarly, an upper sealing portion g21 and a lower sealing portion g22 are formed, and fitted to the upper second seal end portion t12 and the lower second seal end portion t22 to form fitting sealing portions 10, respectively.

The fitting structure of the fitting sealing portions 10 will be described in detail about the upper first seal end portion t11 and the upper sealing portion g11 of the first gasket G1. As shown in FIGS. 15 and 16, the inner and outer valley portions 14, 15 are symmetric, and the inner and outer annular seal projections 52, 53 are symmetric. The contained angle α° of the whole of the inner and outer valley portions 14, 15, and the opposed angle β° of the whole of the inner and outer annular seal projections 52, 53 are set to have the relationship of α°<β°. Preferably, the angles are set to have the relationship of α°+(20 to 40°)=β°. According to the configuration, in the joined state (described later) in which the upper annular projection 11 of the upper first seal end portion t11 is fitted to the annular groove 51, the tapered outer peripheral face 12a of the upper inner annular press projection 12, and the tapered inner peripheral face 52a of the upper inner annular seal projection 52 are in a state where they are pressingly contacted with each other in the innermost diameter portion (see the phantom line in FIG. 16), thereby attaining an advantage that they function as a primary sealing portion S1 which prevents the fluid passing through the fluid passage W1 from entering between the tapered outer and tapered inner peripheral faces 12a, 52a.

Between the width d1 of the upper annular projection 11 and the width d2 of the upper annular groove 51, a relationship of d1>d2 is established. Preferably, the widths are set to have the relationship of d1×(0.75 to 0.85)=d2. Between the projection length h1 of the upper annular projection 11 and the depth h2 of the upper annular groove 51, a relationship of h1<h2 is established. According to the configuration, the upper annular projection 11 and the upper annular groove 51, more specifically, the both inner and outer side peripheral faces of the upper annular projection 11, and the corresponding inner and outer side peripheral faces of the upper annular groove 51 are strongly pressingly contacted with each other to form a secondary sealing portion S2 which exhibits an excellent sealing performance of preventing the fluid from leaking. Moreover, the tapered outer peripheral face 12a of the upper inner annular press projection 12 surely butts against the tapered inner peripheral face 52a of the upper inner annular seal projection 52. Accordingly, there is an advantage that the above-mentioned primary sealing portion S1 is satisfactorily formed. Preferably, these relationships are established also between the lower annular projection 21 and the lower annular groove 51, and the annular groove 61 of the second gasket G2 and the upper and lower annular projections 31, 41.

It is preferable to set the fitting sealing portion 10 so that, in order to enable the secondary sealing portions S2 on the inner- and outer-diameter sides to surely function, as shown in FIG. 16, R1<R2 and R3>R4 are established where R1, R3, R2, R4 are the radii of the annular projection 11, 31 (21, 41) and the annular groove 51 (61) on the inner and outer diameters with respect to the axis P, respectively. The relationship between the height h3 of the annular press projections 12, 22 (13, 23, 32, 42, 3, 43) along the direction of the axis P, and the projection length h1 of the annular projection 11 (21, 31, 41) may be set to be h1=h3 or h1<h3 in place of the relationship of h1>h3 shown in FIG. 16.

The tip ends of the annular press projections 12, 13 and the annular seal projections 52, 53 are formed into a shape which is cut so as not to form a pin angle, i.e., into inclined cut faces 12b, 13b and cut faces 52b, 53b. According to the configuration, even when the tip end of the upper inner annular press projection 12 is slightly expandingly deformed toward the fluid passage W1, only a recess having a triangular section shape which is largely opened is formed in the middle of the fluid passage W1 because they have originally such a cut shape. The fluid existing in the recess easily flows out, and liquid stagnation is substantially prevented from being produced. Moreover, the opening angle of the recess, i.e., the contained angle between the inclined cut face 12b and the tapered inner peripheral face 52a is sufficiently large, and hence the possibility that liquid stagnation due to surface tension is caused is eliminated. The internal and external angles of the tip end of the annular projection 11 are formed as a chamfered shape 11a. Therefore, the press movement into the narrow annular groove 51 can be smoothly performed without causing any problem such as scuffing.

Figure 23A:
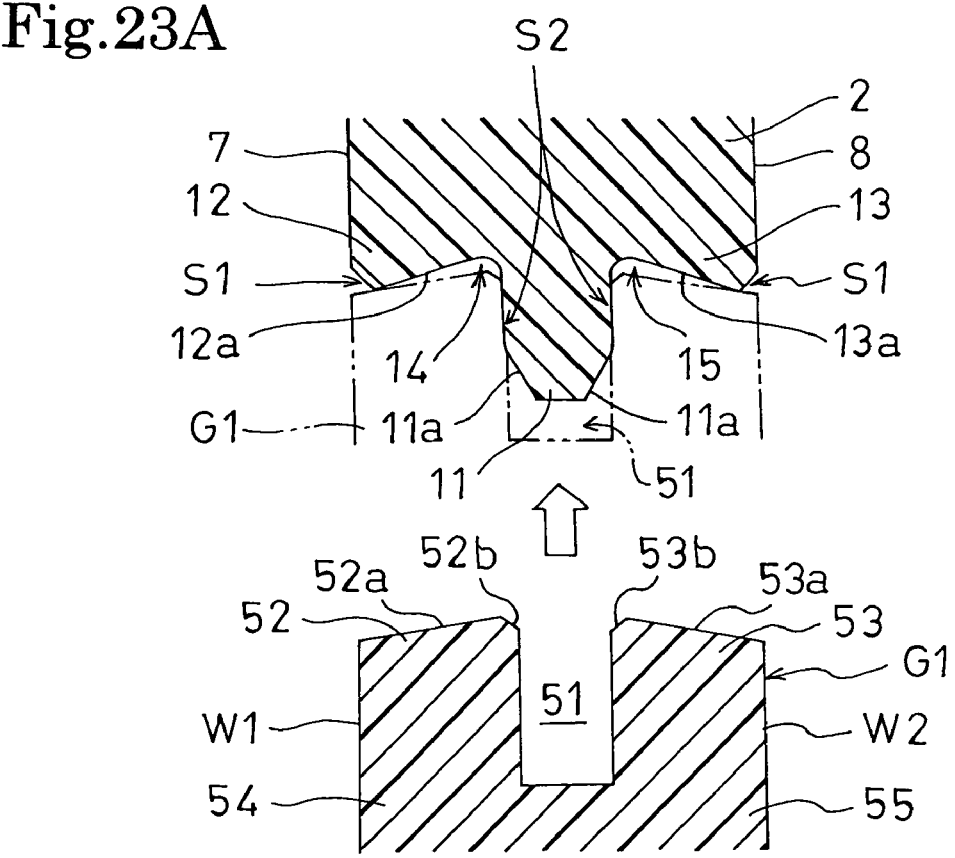
FIGS. 23(a) and 23(b) are section views of main portions showing another shape of an annular projection.

As shown in FIG. 23(a), the annular projection 11 may be formed into a tapered section shape in which the chamfered shape portions 11a of the inner and outer peripheral edge portions of the tip end of the annular projection are clearly enlarged, thereby facilitating the insertion of the annular projection 11 into the annular groove 51. According to the configuration, even when the relative position between the first or second fluid supply/discharge port portion 1A or 2A and the first gasket G1 during assembly is slightly deviated from a desired adequate state, the annular projection 11 is surely guided into the annular groove 51 while the inner or outer chamfered shape portion 11a which has a tapered shape functions as a fitting guide. In this case, the fitting sealing portion 10 (secondary sealing portion S2) is formed by fitting portions between the root portion of the annular projection 11 and tip end portion of the annular groove 51. This structure can be configured similarly in the other annular projections 31, 21, 41 and the second gasket G2.

Figure 23B:
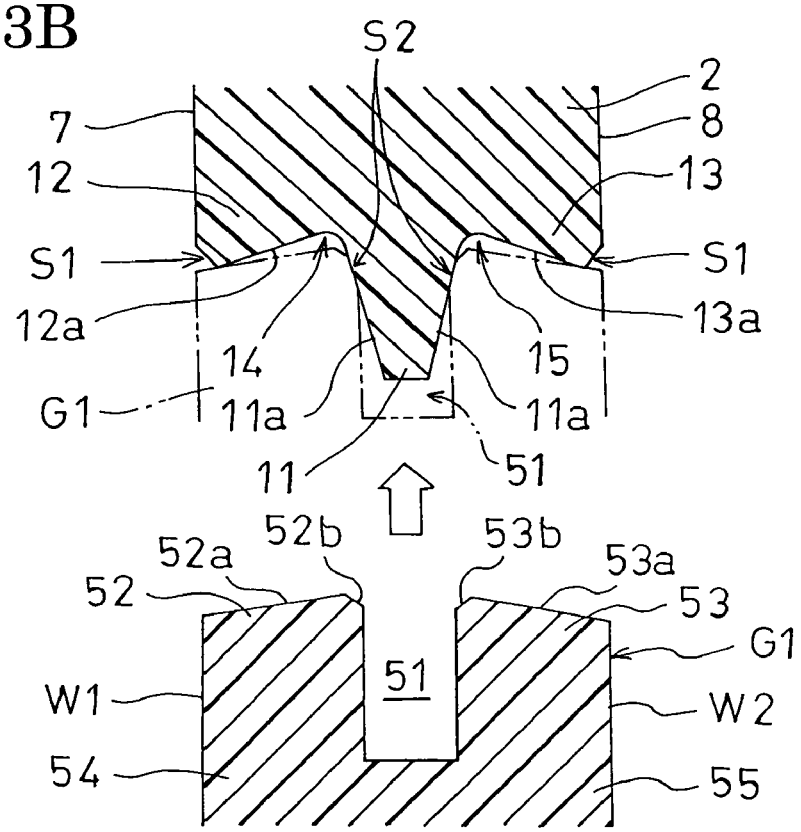

As shown in FIG. 23(b), the chamfered shape portions 11a may be further enlarged, and an extremely tapered shape may be formed so that the whole of the inner and outer side peripheral faces of the annular projection 11 is configured as the inclined tapered peripheral faces 11a.

In this case, the fitting guiding function is enhanced, and the insertion of the annular projection 11 into the annular groove 51 is further facilitated. In this case, the disposition of the fitting sealing portion 10 (secondary sealing portion S2)

produces a wedge effect that the annular projection 11 widens the annular groove 51, so that the tip end portion of the annular groove 51 and the root portion of the annular projection 11 are circumferentially press contacted with each other by line contact or a very small area, whereby the sealing function can be exerted more surely. A similar structure can be configured also in the other annular projections 31, 21, 41 and the second gasket G2.

The fitting sealing portion 10 will be described in further detail. As shown in FIGS. 15 and 16, the opening angle (the opening angle between the valley portions 14, 15) D of the tapered peripheral faces 12a, 13a on the side of the annular projection in the annular press projections 12, 13 is set to a value in the range of 50 to 70 deg. ($50°\leq D°\leq 70°$), and the apical angle E of the tapered peripheral faces 52a, 53a of the annular seal projections 52, 53 is set to a value in the range of 60 to 80 deg. ($60°\leq D°\leq 80°$). The opening angle D and the apical angle E are set so that the apical angle E is a sum of the opening angle D and an angle of 10 to 20 deg. [$D°+(10$ to $20°)=E°$].

More preferably, the opening angle D is set to 69 to 71 deg. ($D°=70°\pm 1°$), the apical angle E is set to 79 to 81 deg. ($E°=80°\pm 1°$), and the apical angle E is set to the opening angle D+9 to 11 deg. ($E°-D°=10\pm 1°$).

The cut angle Ds of the inclined cut faces 12b, 13b of the annular press projections 12, 13 is set to 49 to 51 deg. ($Ds°=50°\pm 1°$), and the attack angle Es of the tip-end cut faces 52b, 53b of the peripheral wall end portions 52, 53 is set to 124 to 126 deg. ($Es°=125°\pm 1°$). According to the setting of the angles, the tapered outer peripheral face 12a and the tapered inner peripheral face 52a, and the tapered inner peripheral face 13a and the tapered outer peripheral face 53a butt against each other in an annular line-contact state, whereby the seal-lip effect is exerted in the secondary sealing portion S2.

Namely, the apical angle E of the tapered peripheral faces 52a, 53a (the tapered inner peripheral face 52a, the tapered outer peripheral face 53a) of the annular seal projections (peripheral wall end portions) 52, 53 with respect to the attracting direction along which the first fluid supply/discharge port portion 1A and the second fluid supply/discharge port portion 2A are attracted to each other is set to a value which is a sum of the opening angle D of the tapered peripheral faces 12a, 13a (the tapered outer peripheral face 12a, the tapered inner peripheral face 13a) on the side of the annular projection 11 in the annular press projections 12, 13 with respect to the attracting direction, and an angle of 10 to 20 deg., preferably, 10 deg. or about 10 deg. The apical angle E is set to 60 to 80 deg., preferably, 80 deg. or about 80 deg.

In the configuration where the apical angle E and the opening angle D are set to values in the vicinity of 90 deg. and similar to an obtuse angle, the projection amounts of the annular press projections 12, 13 in the attracting direction (axial direction) are smaller than the radial width, and the strengths and rigidities of the projections are relatively improved. Accordingly, there is an advantage that, while restricting the expansions of the annular seal projections 52, 53, the possibility that they (the annular press projections 12, 13) themselves are radially expandingly deformed can be effectively suppressed.

The component force by which the tapered peripheral faces 52a, 53a radially press the annular press projections 12, 13 in an expanding manner can be reduced by the bitings of the annular seal projections 52, 53 into the valley portions 14, 15. Also by this phenomenon, the radially expanding deformations of the annular press projections 12, 13 can be suppressed.

The above-described structure of the fitting sealing portion 10 is similarly applied to the lower side of the first gasket G1, and also to the second gasket G2, and corresponding portions are denoted by corresponding reference numerals. In the second gasket G2, the diameter is different, but the section shape is strictly identical with that of the first gasket G1. However, the shapes of the upper and lower second seal end portions t12, t22 of the first and second fluid supply/discharge port portions 1A, 2A are slightly different from those of the upper and lower first seal end portions t11, t21 because no fluid passage exists on the outer peripheral side.

In the upper second seal end portion t12, namely, a lower-end inner peripheral portion 6b for forming a lower end portion of the valve case 6 exists in a state where it is continuous to a tapered inner peripheral face 33a of the annular press projection 33. The lower-end inner peripheral portion 6b serves as a guide in the case where the upper sealing portion g21 of the second gasket G2 is fitted to the upper second seal end portion t12, and can perform a function of cooperating with the tapered inner peripheral face 33a to prevent an outer peripheral wall 65 of the second gasket G2 from being expandingly deformed. In the lower second seal end portion t22, the panel member 5 continuously exists on the outer periphery side of the outer annular press projection 43. The effect that, when the lower sealing portion g22 is fitted to the lower second seal end portion t22, the expanding deformation of the outer annular seal projection 63 of the lower sealing portion g22 of the second gasket G2 is blocked by the tapered inner peripheral face 43a is enhanced.

By contrast, in the first and second gaskets G1, G2, the first gasket G1 that is an intermediate gasket in which the fluid passages 7, 8 exist on both the inner- and outer-diameter sides in the joined state is formed in a state where the outer peripheral face 55a which is an outer peripheral portion of the first gasket is a wall for forming an annular fluid path W2 through which the annular fluid passage 4a of the first fluid supply/discharge port portion 1A existing on the outer-diameter side of the first gasket G1 communicates with the annular fluid passage 8 of the second fluid supply/discharge port portion 2A. When it is configured so that both the inner and outer peripheral face 54a, 55a of the first gasket G1 function also as the walls for forming the fluid passages W1, W2, a relationship of "thickness of first gasket G1"="distance between annular fluid passages 3a, 7 and pipe-like fluid passages 4a, 8" is attained, and it is possible to further compactify the connecting portion between the first and second fluid supply/discharge port portions 1A, 2A.

As indicated by the phantom lines in FIG. 14, a ring-like flange 1f for attachment and detachment which is laterally projected may be integrally formed on the outer peripheral wall 65 of the second gasket G2. In this configuration, there is an advantage that, when the second gasket G2 is to be pulled out from the first or second fluid supply/discharge port portion 1A, 2A, the pulling operation can be easily performed by, for example, pulling the flange 1f by a tool or the fingers. In this case, the thickness of the attachable and detachable flange 1f is smaller than the distance between the first and second fluid supply/discharge port portions 1A, 2A in the joined state.

Next, holding means I will be described. As shown in FIGS. 15 and 16, the holding means I is configured so that the first fluid supply/discharge port portion 1A of the integration panel 1 and the second fluid supply/discharge port portion 2A of the valve 2 are attracted to each other via the first and second gaskets G1, G2, and the attracting function holds the joined state where the upper first and upper second seal end portions t11, t12 of the first fluid supply/discharge port portion 1A and the upper sealing portions g11, g21 of the first and second gaskets G1, G2, and the lower first and lower second seal end portions t21, t22 of the second fluid supply/discharge port portion 2A and the lower sealing portions g12, g22 of the first and second gaskets G1, G2 are fitted to each other to form the fitting sealing portions 10. Namely, the annular projections 11, 31 of the second fluid supply/discharge port portion 2A are fitted into the upper annular grooves 51, 61 of the first and second gaskets G1, G2, and the annular projections 21, 41 of the first fluid supply/discharge port portion 1A are fitted into the lower annular grooves 51, 61 of the first and second gaskets G1, G2.

The specific structure of the holding means I is configured by: a pair of bolts 66 which are passed through bolt passage holes 9a of the mounting flange 9 of the second fluid supply/discharge port portion 2A; and nut portions 67, 67 which are formed correspondingly with the pair of bolt passage holes 9a, 9a in the first fluid supply/discharge port portion 1A (the panel member 5). By a fastening operation of screwing the bolts 66 with the nut portions 67, the valve 2 can be attracted to the integration panel 1, and the attracted state can be held. In the case where the press contact forces of the fitting sealing portions 10 are reduced because of aging, occurrence of creep, or the like, the reduction can be coped with by further fastening the bolts 66, and therefore the excellent sealing property can be held.

Embodiment 10

As shown in FIG. 17, a connecting structure for an integration panel and a fluid device according to Embodiment 10 is used for communicatingly connecting the integration panel 1 to a pump (such as a bellows pump for a circulation line of a cleaning apparatus) 2 which is an example of a fluid device, via a flanged pipe 71. The configuration of the connecting structure itself in which the inner and outer gaskets G1, G2 are interposed is identical with that of the connecting structure described in Embodiment 9. Therefore, only principal components are denoted by reference numerals, and the detailed description of the configuration is omitted.

The integration panel 1 is basically identical in structure except that the direction of the discharge-side fluid passage 4 is opposite to that in the case of the integration panel 1 of Embodiment 9. In the configuration of Embodiment 9, however, the connecting structure for the integration panel and the fluid device is configured on the upper face of the integration panel. By contrast, the connecting structure of Embodiment 2 is configured on a side face of the integration panel 1. The supply/discharge fluid passages 7, 8 of the pump 2 are opened in the side face. In the integration panel 1, the pair of fluid passages 3, 4 have the double-pipe structure. By contrast, the fluid passages are of the independent type in which they are vertically arranged.

The flanged pipe 71 consists of: a flange portion 72 having the above-described mounting flange 9; and a substantially bifurcated pipe portion 73 which is continuous to the flange portion. The pipe portion 73 is configured by a supply-side pipe 73A having a pipe-like supply-side fluid passage 74, and a discharge-side fluid passage 73B having a pipe-like discharge-side fluid passage 75. In the flange portion 72, the supply-side fluid passage 74 is formed into a pipe-like shape centered at the axis P, and opened while being directly opposed to the vertical passage 3a of the integration panel 1, and an annular passage portion 75a which is opened while being directly opposed to the vertical ring passage 4a of the integration panel 1 is formed in a state where it is continuous to the discharge-side fluid passage 75. The fluid passages 74, 75 are communicatingly connected and coupled to an in-side port 76 and out-side port 77 of the pump 2 by means such as fusion bonding.

As described above, the flanged pipe 71 having the flange portion 72 of the double-pipe structure, and the two independent pipe portions 73 is used. Therefore, the first fluid supply/discharge port portion 1A of the double-pipe structure in the integration panel 1, and the second fluid supply/discharge port portion 2A configured by the pair of in-side and out-side ports 76, 77 which are arranged in parallel, i.e., the integration panel 1 and the pump 2 can be communicatingly connected to each other in juxtaposed, unforced, and compact manners, although the fluid passages have the different opening structures.

Embodiment 11

FIGS. 18 and 19 show a connecting structure for an integration panel and a fluid device according to Embodiment 11. The connecting structure is different only in the holding means I from that of Embodiment 9. The holding means I of a sixth other structure will be described. In FIGS. 18 and 19, portions corresponding to those of Embodiment 9 shown in FIGS. 14 to 16 are denoted by corresponding reference numerals. As shown in FIGS. 18 and 19, the holding means I of the sixth other structure is configured by: a cylindrical nut 81 having an internal thread portion 81n which is screwable with an external thread portion 1n formed on an outer peripheral portion of the projection-like first fluid supply/discharge port portion 1A that is formed on the upper face of the integration panel 1, and that is circular in a plan view; and a split ring 82 which has two or three or more split pieces, and which interferes in the direction of the axis P of the annular fluid passage 7 with the outward flange 9 that is formed in a lower end portion of the valve case 6 of the valve 2. The holding means I is configured as holding means having the attracting function in which, by a fastening operation of the cylindrical nut 81 in which the internal thread portion 81n is screwed with the external thread portion 1n of the first fluid supply/discharge port portion 1A, the fluid supply/discharge port portions 1A, 2A can be attracted in the direction along which they approach each other via the two gaskets G1, G2, and the attracted state can be held.

An opening portion 83a of an inward flange 83 which is formed on the side of the valve 2 (the upper side) of the cylindrical nut 81 is set to have a minimum internal diameter which is sufficient for allowing the passage of the outward flange 9. The outer diameter of the split ring 82 is set to be slightly smaller than the inner diameter of the internal thread portion 81n so that the split ring can freely enter into the cylindrical nut 81, and the inner diameter is set to a minimum dimension by which the split ring is fittable onto the outer diameter portion of the circular second fluid supply/discharge port portion 2A of the valve 2. In this case, in order to mount the split ring 82, the axial length of a small-diameter portion of the second fluid supply/discharge port portion 2A excluding the outward flange 9 must be larger than the sum of the axial length of the cylindrical nut 81 and the thickness of the split ring 82. Specifically, the conditions that, as shown in FIG. 19(b), the conditions in which the distance d3 between the cylindrical nut 81 in a state where it butts against a root portion 6t of the valve case 6, and the outward flange 9 is larger than the thickness d4 of the split ring 82 (d3>d4) are imposed.

Between an inner end portion of the internal thread portion 81n of the cylindrical nut 81 and the inward flange 83, an inner peripheral face portion 81m which is axially slidable on the split ring 82, and which has a length in the direction of the axis P that covers the width dimension of the split ring 82 is formed into a flat inner peripheral face which is coaxial with the axis P. Namely, the inner diameter portion 81a between the internal thread portion 81n of the cylindrical nut 81 and the inward flange 83 is formed into a flat inner peripheral face which is concentric with the supply-side fluid passage 7, and the dimensions are set to a fitting tolerance state where the inner diameter of the inner peripheral face portion 81m is very slightly larger than the outer diameter of the split ring 82 which is formed so as to have a rectangular section shape. By contrast, an outer diameter portion of the second fluid supply/discharge port portion 2A is formed into a flat outer peripheral face which is concentric with the supply-side fluid passage 7, and has a diameter which is substantially equal to the inner diameter of the split ring 82. According to the configuration, it is possible to eliminate disadvantages that, when the cylindrical nut 81 is screwingly advanced, the split ring 82 is inclined to gouge, and that the pressing force in the direction of the axis P due to the screw advancement of the cylindrical nut 81 is not well transmitted to the outward flange 9. Therefore, the outward flange 9 can be effectively pressed, and the first and second fluid supply/discharge port portions 1A, 2A can be satisfactorily attracted in the direction along which they approach each other.

The fluid supply/discharge port portions 1A, 2A are connected and coupled to each other by the holding means I of the sixth other structure in the following operation procedure. First, as shown in FIG. 19(a), the cylindrical nut 81 is passed over the outward flange 9 to be fitted onto the outer periphery of the second fluid supply/discharge port portion 2A of the valve 2, and is moved to the innermost portion (until it butts against the root portion 6t). Then, as shown in FIG. 19(b), the split ring 82 is passed between the outward flange 9 and the tip end of the cylindrical nut 81, to be fitted onto the second fluid supply/discharge port portion 2A. At or prior to this, the first and second gaskets G1, G2 may be attached to the end face of one of the fluid supply/discharge port portions 1A, 2A via provisional fittings between the annular projections 11, 21, 31, 41 and the annular grooves 51, 61. Next, the first fluid supply/discharge port portion 1A is placed on the second fluid supply/discharge port portion 2A via the gaskets G1, G2, the cylindrical nut 81 is slidingly moved under this state, and a fastening operation [see FIG. 19(c)] is then conducted, whereby the connection state shown in FIG. 18 is obtained. In FIG. 19, for the sake of convenience in drawing, the integration panel 1 and valve 2 which are vertically stacked to each other are shown in a laterally arranged manner.

Embodiment 12

FIGS. 20 and 21 show a connecting structure for an integration panel and a fluid device according to Embodiment 12. The connecting structure is different only in the holding means I from that of Embodiment 9. The holding means I of a seventh other structure will be described.

In FIGS. 20 and 21, portions corresponding to those of Embodiment 9 shown in FIGS. 14 to 16 are denoted by corresponding reference numerals. The holding means I of the seventh other structure comprises: first and second truncated conical end portions 1D, 2D in which the diameters of the first and second fluid supply/discharge port portions 1A, 2A are increased as further advancing toward the respective end faces; a split press ring 85 consisting of a pair of half-arcuate members 84, 84 having an inner peripheral face having a substantially L-like section shape formed by a first tapered inner peripheral face 84a butting against a tapered outer peripheral face 1d of the first truncated conical end portion 1D, and a second tapered inner peripheral face 84b butting against a tapered outer peripheral face 2d of the second truncated conical end portion 2D; a bolt 86 for attracting the half-arcuate members 84, 84; and a nut 87 which is formed in one of the half-arcuate members 84.

In a state where the pair of half-arcuate members 84 stride over and cover the first truncated conical end portion 1D and the second truncated conical end portion 2D in the joined state, the fluid supply/discharge port portions 1A, 2A are attracted together by a force exerted by butting of the tapered faces caused by fastening the bolt 86 passed through a through hole 84h of the other half-arcuate member 84, and the nut 87 to attract together the half-arcuate members 84, 84 in which one end is hingedly pivoted at a fulcrum Q. The split press ring 85 is preferably formed by a fluororesin material. Alternatively, the ring may be made of another material such as an aluminum alloy.

The fluid supply/discharge port portions 1A, 2A are connected and coupled to each other by the holding means I of the seventh other structure in the following operation procedure. First, a preliminary coupling operation of lightly connecting and coupling the first and second fluid supply/discharge port portions 1A, 2A with each other via the first and second gaskets G21, G2 as shown in FIG. 21(a) is performed. As shown in FIG. 21(b), next, the sprit press ring 85 is put on the first and second truncated conical end portions 1D, 2D on which the preliminary coupling operation has been applied, and an operation of fastening the bolt 86 is performed. As a result of the fastening of the bolt 86, the gaskets G1, G2 are deeply fitted into the first and second fluid supply/discharge port portions 1A, 2A, and, as shown in FIG. 21(c), a connected and coupled state of the integration panel 1 and the valve 2 is obtained.

Embodiment 13

FIG. 22 shows a connecting structure for an integration panel and a fluid device according to Embodiment 13. The connecting structure is different only in the holding means I from that of Embodiment 9. The holding means I of an eighth other structure will be described. In FIG. 22, portions corresponding to those of Embodiment 9 shown in FIGS. 14 to 16 are denoted by corresponding reference numerals. The holding means I of the eighth other structure comprises: the projection-like first fluid supply/discharge port portion 1A which is formed on the upper face of the integration panel 1 in a state where the external thread portion in is formed in the outer peripheral portion, and which is circular in a plan view; the flange portion 9 which is formed on a lower end portion of the valve case 6 in a state where an external thread portion 9n is formed in the outer peripheral portion of the second fluid supply/discharge port portion 2A; first and second ring nuts 91, 92 having internal thread portions 91n, 92n which are screwable with the external thread portions 1n, 9n; and an engagement ring 93 which is fittable into outer peripheral grooves 91m, 92m of the ring nuts 91, 92, and which has a substantially U-like section shape.

The ring nuts 91, 92 and the engagement ring 93 are made of a material which is a fluororesin such as PFA or PTFE, and have a certain degree of flexibility. The fluid supply/discharge port portions 1A, 2A are connected and coupled to each other by the holding means I of the third other structure in the following operation procedure. The engagement ring 93 is engaged with the ring nuts 91, 92, whereby the integrated first and second ring nuts 91, 92 are previously formed. The integrated first and second ring nuts 91, 92 are screwed on the first and second fluid supply/discharge port portions 1A, 2A which are attracted together via the gaskets G1, G2 to be set to the assembled state, thereby forming a connecting structure for an integration panel and a fluid device. It is a matter of course that, in this case, the external thread portions 1n, 9n must be identical to each other. After the screwing, the ring nuts 91, 92 can be turned to be fastened more strongly, or to perform further fastening.

Alternatively, the following assembling procedure may be possible. In a state where the ring nuts 91, 92 are screwed to the corresponding external thread portions 1n, 9n, an attracting step is conducted in which the first and second fluid supply/discharge port portions 1A, 2A are attracted together via the first and second gaskets G1, G2, and the port portions are connected to each other in a sealed state where the gaskets G1, G2 are pressingly contacted with each other. The attracting step is conducted by dedicated attracting means other than the holding means I. Thereafter, the engagement ring 93 is forcedly deformed by expanding the diameter, whereby the ring is fitted into the outer peripheral grooves 91m, 92m of the first and second ring nuts 91, 92 which are screwed in a state where the ring nuts are adjacent to the external thread portions 1n, 9n, respectively. As a result, a connecting structure for an integration panel and a fluid device is formed. Namely, the engagement ring 93 is engaged by forced fitting with the ring nuts 91, 92.

The thus configured holding means I literally has only a function of holding the sealed connection state of the first and second fluid supply/discharge port portions 1A, 2A via the gaskets G1, G2. However, the ring nuts 91, 92 and the engagement ring 93 are relatively rotatable, and therefore both of the ring nuts 91, 92 can singly rotatingly move. In the case where the seal press contact force is reduced because of aging, occurrence of creep, or the like, a further fastening operation can be performed by forcedly rotating one or both of the ring nuts 91, 92.

Other Embodiments

In the connecting structure for an integration panel and a fluid device shown in FIGS. 14 to 16, although not illustrated, the second gasket portions G2 on the outer-diameter side may have a structure in which the vertical dimension of the outer peripheral wall 63 is shorter than that of the inner peripheral wall 53, and which is formed simply by horizontally cutting the upper and lower ends. In the double-pipe connecting structure, the outer peripheral wall 63 of the second gasket portions G2 on the outermost diameter side may not be provided with the sealing function. The gaskets G1, G2 in Embodiments 9 to 13 have a shape which is vertically and laterally symmetric. Alternatively, for example, the gaskets may be configured so that the inner and outer peripheral walls have different lengths or thicknesses, or they are vertically asymmetric, and are not restricted to the illustrated shapes. A connecting structure for a triple or more integration panel having one or plural annular fluid passages in the outside of the outer annular fluid passage 8, and a fluid device may be possible. A configuration in which, in gaskets other than the gasket existing in the outermost side, their inner and outer peripheral faces function also as fluid passages may be employed.

The term "fluid device" in the invention is defined as a generic term of devices relating to fluid, such as a valve, a pump, an accumulator, a fluid storage vessel, a heat exchanger, a regulator, a pressure gage, a flowmeter, a heater, and a flanged pipe, or in summary devices other than an integration panel. As the holding means having the attracting function, a turn buckle type structure (example: a structure in which, in the structure shown in FIG. 10 or 22, one of the external thread portions 1n, 9n is formed as a reverse thread, and a turn-buckle nut straddling over the external thread portions 1n, 9n is screwed) may be employed. The annular press projections 33, 43 are read as the annular press walls 33, 43, and the annular press projections 12, 13, 22, 23, 32, 42 and the annular press walls 33, 43 are generally defined as "annular press portion".

The invention claimed is:

1. A connecting structure for an integration panel and a fluid device, wherein, when a first fluid supply/discharge port portion of an integration panel having said first fluid supply/discharge port portion where pipe-like fluid passages are opened, and a second fluid supply/discharge port portion of a fluid device having said second fluid supply/discharge port portion where pipe-like fluid passages are opened are to be communicatingly connected to each other in a state where said fluid passages are sealed by a ring-like gasket interposed between said first fluid supply/discharge port portion and said second fluid supply/discharge port portion,
   in said first fluid supply/discharge port portion and said second fluid supply/discharge port portion, annular projections are formed on outer-diameter portions of said fluid passages which are opened in end faces,
   said gasket is configured by a flexible material having: a fluid path which is formed to allow said corresponding fluid passages of said first and second fluid supply/discharge port portions to communicate with each other; a pair of annular grooves which are formed on an outer-diameter portion of said fluid path to be fitted respectively to said annular projections formed on said end faces of said first and second fluid supply/discharge port portions; and inner and outer peripheral wall end portions which are projected in an axial direction of said first and second fluid supply/discharge port portions in order to form said annular grooves,
   annular press portions which are buttable against said peripheral wall end portion on said inner-diameter side are formed on inner-diameter sides of said annular projections on said end faces of said first and second fluid supply/discharge port portions,
   said annular press portions are formed into forward-narrowed annular projections having tapered peripheral faces in which side peripheral faces on sides of said annular projections are inclined so that valley portions surrounded by said annular press portions and said annular projections have an inward-narrowed shape, said peripheral wall end portion on the inner-diameter side is formed into a forward-narrowed annular projection which has a tapered peripheral face butting against said tapered peripheral faces of said annular press portions, and which is enterable into said valley portions,
   said first fluid supply/discharge port portion and said second fluid supply/discharge port portion are attracted to each other via said gasket, whereby said annular projection of said first fluid supply/discharge port portion and said annular groove of one end of said gasket, and said annular projection of said second fluid supply/discharge port portion and said annular groove of an-other end of said gasket are fitted respectively to each other, and said tapered peripheral faces of said annular press portions are press contacted with said tapered peripheral face of said peripheral wall end portion on the inner-diameter side to form a sealing portion.

2. A connecting structure for an integration panel and a fluid device according to claim 1, wherein inclination angles of said tapered peripheral faces of said annular press portions are set to be different from an inclination angle of said tapered peripheral face of said peripheral wall end portion on the inner-diameter side so that said sealing portion is configured by a press contact only between end portions of said tapered peripheral faces of said annular press portions and said tapered peripheral face of said peripheral wall end portion on the inner-diameter side, said end portion being on a side which is radially remote from said annular projections.

3. A connecting structure for an integration panel and a fluid device according to claim 1, wherein projection amounts of said annular projections in the direction of the axis are set to be larger than projection amounts of said annular press portions in the direction of the axis.

4. A connecting structure for an integration panel and a fluid device according to claim 1, wherein a state is configured where said peripheral wall end portion on the inner-diameter side is expandingly displaced to be press contacted with said annular projections to form a sealing portion, by a component force caused by attracting said first fluid supply/discharge port portion and said second fluid supply/discharge port portion via said gasket to cause said both tapered peripheral faces to be in press contact with each other.

5. A connecting structure for an integration panel and a fluid device according to claim 1, wherein said gasket has a substantially H-like section shape.

6. A connecting structure for an integration panel and a fluid device according to claim 1, wherein, in order to facilitate insertion of said annular projections into said annular grooves, said annular projections are formed into a tapered section shape in which an inner peripheral edge and/or outer peripheral edge of a tip end is chamfered.

7. A connecting structure for an integration panel and a fluid device according to claim 1, wherein holding means for holding the joined state where said sealing portion is formed is equipped.

8. A connecting structure for an integration panel and a fluid device according to claim 7, wherein said holding means performs an attracting function of attracting said first fluid supply/discharge port portion and said second fluid supply/discharge port portion to obtain the joined state.

9. A connecting structure for an integration panel and a fluid device, wherein, when a first fluid supply/discharge port portion of an integration panel having said first fluid supply/discharge port portion where a pipe-like fluid passage or an annular fluid passage, and one or more annular fluid passages are concentrically formed and opened, and a second fluid supply/discharge port portion of a fluid device having said second fluid supply/discharge port portion where a pipe-like fluid passage or an annular fluid passage, and one or more annular fluid passages are concentrically formed and opened are to be communicatingly connected to each other in a state where respective ones of said plural fluid passages correspond to each other, and are sealed by plural ring-like gaskets interposed between said first fluid supply/discharge port portion and said second fluid supply/discharge port portion,
   in said first fluid supply/discharge port portion and said second fluid supply/discharge port portion, annular projections are formed on outer-diameter portions of said fluid passages which are opened in end faces,
   said gaskets are configured by flexible materials having: fluid paths which are formed to allow said corresponding fluid passages of said first and second fluid supply/discharge port portions to communicate with each other; a pair of annular grooves which are formed on outer-diameter portions of said fluid paths to be fitted respectively to said annular projections formed on said end faces of said first and second fluid supply/discharge port portions; and peripheral wall end portions on the inner- and outer-diameter sides which are projected in an axial direction of said first and second fluid sup-ply/discharge port portions in order to form said annular grooves, annular press portions which are buttable respectively against said peripheral wall end portions on the inner- and outer-diameter sides are formed on the inner- and outer-diameter sides of said annular projections on the end faces of said first and second fluid supply/discharge port portions said annular press portions are formed into forward-narrowed annular projections having tapered peripheral faces in which side peripheral faces on sides of said annular press projections are inclined so that valley portions surrounded by said annular press portions and said annular projections have an inward-narrowed shape, said peripheral wall end portions are formed into forward-narrowed annular projections which have tapered peripheral faces butting against said tapered peripheral faces of said corresponding annular press portions, and which are enterable into said valley portions, said first fluid supply/discharge port portion and said second fluid supply/discharge port portion are attracted to each other via said plural gaskets, whereby said annular projections of said first fluid sup-ply/discharge port portion and said annular grooves of one ends of said gaskets, and said annular projections of said second fluid supply/discharge port portion and said annular grooves of other ends of said gaskets are fitted respectively to each other, and said tapered peripheral faces of said annular press portions are press contacted with said tapered peripheral faces of said peripheral wall end portions to form a sealing portion, and in said gaskets, an intermediate gasket in which said fluid passages exist on both inner- and outer-diameter sides in the joined state is formed in a state where an outer peripheral face of said gasket is a wall for forming an annular fluid path through which said annular fluid passage of said first fluid supply/discharge port portion existing on the outer-diameter side of said intermediate gasket communicates with said annular fluid passage of said second fluid supply/discharge port portion.

10. A connecting structure for an integration panel and a fluid device according to claim 9, wherein inclination angles of said tapered peripheral faces of said annular press portions are set to be different from inclination angles of said tapered peripheral faces of said peripheral wall end portions so that said sealing portion is configured by a press contact only between end portions of said tapered peripheral faces of said annular press portions and said tapered peripheral faces of said peripheral wall end portions, said end portions being on a side which is radially remote from said annular projections.

11. A connecting structure for an integration panel and a fluid device according to claim 9, wherein projection amounts of said annular projections in the direction of the axis are set to be larger than projection amounts of said annular press portions in the direction of the axis.

12. A connecting structure for an integration panel and a fluid device according to claim 9, wherein a state is configured where said peripheral wall end portions on the inner-diameter side are diameter-increasing displaced, and said peripheral wall end portions on the outer-diameter side are diameter-decreasing displaced to be press contacted with said annular projections to form a secondary sealing portion, by a component force caused by attracting said first fluid supply/discharge port portion and said second fluid supply/discharge port portion via said plural gaskets to cause said both tapered peripheral faces to be in press contact with each other.

13. A connecting structure for an integration panel and a fluid device according to claim 9, wherein said plural gaskets have a substantially H-like section shape.

14. A connecting structure for an integration panel and a fluid device according to claim 9, wherein, in order to facilitate insertion of said annular projections into said annular grooves, said annular projections are formed into a tapered section shape in which an inner peripheral edge and/or outer peripheral edge of a tip end is chamfered.

15. A connecting structure for an integration panel and a fluid device according to claim 9, wherein holding means for holding the joined state where said sealing portion is formed is equipped.

16. A connecting structure for an integration panel and a fluid device according to claim 15, wherein said holding means performs an attracting function of attracting said first fluid supply/discharge port portion and said second fluid supply/discharge port portion to obtain the joined state.

* * * * *

UNITED STATES PATENT AND TRADEMARK OFFICE
CERTIFICATE OF CORRECTION

| | | |
|---|---|---|
| PATENT NO. | : 7,942,165 B2 | Page 1 of 1 |
| APPLICATION NO. | : 11/988555 | |
| DATED | : May 17, 2011 | |
| INVENTOR(S) | : Masayoshi Katsura | |

It is certified that error appears in the above-identified patent and that said Letters Patent is hereby corrected as shown below:

In claim 9, col. 37, lines 4 and 27, change "sup-ply" to "supply"

Signed and Sealed this
Thirteenth Day of March, 2012

David J. Kappos
*Director of the United States Patent and Trademark Office*